United States Patent [19]

Ide et al.

[11] Patent Number: 5,258,234

[45] Date of Patent: Nov. 2, 1993

[54] THERMAL IMAGE TRANSFER RECORDING MEDIUM

[75] Inventors: Youji Ide, Mishima; Tetsuji Kunitake, Numazu; Naoshi Yamamoto, Fuji, all of Japan

[73] Assignee: Ricoh Company Ltd., Tokyo, Japan

[21] Appl. No.: 849,178

[22] Filed: Mar. 10, 1992

Related U.S. Application Data

[62] Division of Ser. No. 409,745, Sep. 20, 1989.

[30] Foreign Application Priority Data

Sep. 28, 1988 [JP] Japan .................. 63-240827
Dec. 19, 1988 [JP] Japan .................. 63-318615
Mar. 17, 1989 [JP] Japan .................... 1-63465
Jun. 28, 1989 [JP] Japan ................... 1-163848

[51] Int. Cl.$^5$ .............................................. B32B 9/00
[52] U.S. Cl. ................................ 428/500; 428/195; 428/207; 428/446; 428/484; 428/913; 428/914
[58] Field of Search .................... 428/195, 488.1, 913, 428/914, 522, 411.1, 500, 207, 446, 484

[56] References Cited

U.S. PATENT DOCUMENTS 4,600,628 7/1986 Ishii et al. .................... 428/216

Primary Examiner—Patrick J. Ryan
Assistant Examiner—W. Krynski
Attorney, Agent, or Firm—Oblon, Spivak, McClelland, Maier & Neustadt

[57] ABSTRACT

A thermal image transfer recording medium is disclosed, which comprises a substrate and an ink layer formed thereon comprising as the main components (i) a coloring agent and (ii) a copolymer consisting of at least a monomer selected from Group A consisting of acrylonitrile and methacrylonitrile and at least a monomer selected from Group B consisting of monomers represented by the following formula (I);

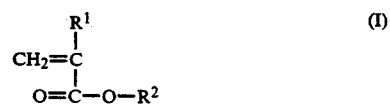

wherein $R^1$ represents hydrogen or a methyl group; and $R^2$ represents hydrogen, a straight-chain or branched alkyl group having 1 to 4 carbon atoms, a glycidyl group, or a hydroxyalkyl group having 2 to 4 carbon atoms.

13 Claims, No Drawings

THERMAL IMAGE TRANSFER RECORDING MEDIUM

This is a division of application Ser. No. 07/409,745, filed on Sep. 20, 1989.

BACKGROUND OF THE INVENTION

1. Field of the Invention

The present invention relates to a thermal image transfer recording medium capable of producing highly reliable transferred images having improved friction and scratch resistance and heat resistance, and chemical resistance.

2. Discussion of Background

There are conventionally known thermal image transfer recording media having an ink layer comprising an epoxy resin with a softening point of 60° to 110° C. and a coloring agent, as disclosed in Japanese Laid-Open Patent Application 60-59159. Such conventional thermal image transfer recording media can yield transferred images on a sheet of plain paper, a plastic film and a sheet of metallic foil in one coloring operation, and further, the thus transferred images have good preservability and wear-resisting properties.

However, since the ink layer of the above-mentioned conventional thermal image transfer recording medium comprises the epoxy resin having a softening point of 60° to 110° C., as previously mentioned, the thermal image transfer recording medium is poor in the friction-resisting properties at high temperatures. More specifically, the transferred images become blurred and illegible when rubbed with corrugated cardboard at high temperatures, for instance, at 70° C.

Further, images transferred on a recording sheet from the above-mentioned conventional recording medium containing epoxy resin do not have so much sufficient lubricating properties that they readily lift off the recording sheet when brought into contact with hard materials such as metal edge or a nail.

In addition, the conventional thermal image transfer recording medium has the shortcoming that the transferred images obtained are vulnerable to chemicals, for example, industrial alcohol, engine oil, brake oil, kerosene, car wax, toluene, xylene, and "Perclene" for dry-cleaning.

SUMMARY OF THE INVENTION

It is therefore a first object of the present invention to provide a thermal image transfer recording medium capable of producing highly reliable transferred images having excellent friction and scratch resistance and chemical resistance.

A second object of the present invention is to provide a thermal image transfer recording medium in which an ink layer does not readily lift off a substrate at low temperatures.

A third object of the present invention is to provide a thermal image transfer recording medium having an improved thermosensitivity.

The above-mentioned objects can be attained by a thermal image transfer recording medium comprising a substrate and an ink layer formed thereon, which ink layer comprises as the main components (i) a coloring agent and (ii) a copolymer consisting of at least one monomer selected from Group A consisting of acrylonitrile and methacrylonitrile and at least one monomer selected from Group B consisting of the monomers represented by formula (I);

wherein $R^1$ represents hydrogen or a methyl group; and $R^2$ represents hydrogen, a straight-chain or branched alkyl group having 1 to 4 carbon atoms, a glycidyl group, or a hydroxyalkyl group having 2 to 4 carbon atoms.

DESCRIPTION OF THE PREFERRED EMBODIMENTS

According to the present invention, the following types of the thermal image transfer recording media can be provided:

(1) A thermal image transfer recording medium which is so constructed that an ink layer comprises as the main components (i) a coloring agent and (ii) a copolymer consisting of at least a monomer selected from the following group A and at least a monomer selected from the following group B.

Group A: acrylonitrile and methacrylonitrile.

Group B: a monomer represented by the following formula (I);

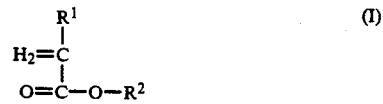

wherein $R^1$ represents hydrogen or a methyl group; and $R^2$ represents hydrogen, a straight-chain or branched alkyl group having 1 to 4 carbon atoms, a glycidyl group, or a hydroxyalkyl group having 2 to 4 carbon atoms.

(2) A thermal image transfer recording medium which is so constructed that a lubricating properties-imparting agent layer and the above-mentioned ink layer are successively overlaid in that order on a substrate.

(3) A thermal image transfer recording medium which is so constructed that an adhesion-promoting agent layer is formed on the above-mentioned substrate, and then the ink layer as in the above-mentioned type (1), or the lubricating property imparting layer and the ink layer as in the above-mentioned type (2) are formed thereon.

(4) A thermal image transfer recording medium which is so constructed that a thermosensitivity-promoting agent layer comprising as the main components a thermofusible material and/or a heat-softening material is formed on the above-mentioned ink layer employed in the types (1), (2) and (3).

Examples of the substrate for use in the present invention are conventionally known plastic film and paper. For example, a plastic film having relatively high heat-resistance, such as polyester film, polycarbonate film, triacetyl cellulose film, nylon film and polyimide film; and a sheet of paper such as cellophane and perchment paper are appropriate.

It is preferable that the thickness of the substrate for use in the present invention be in the range of 2 to 15 μm, in the case where images are transferred from the thermal image transfer recording medium to a recording sheet, with the application of thermal energy to the recording medium by a thermal head. In such a case, a heat-resistant protective layer may be provided on the back side of the substrate, opposite to the ink layer, to improve the heat-resistant properties thereof.

Examples of the materials for the heat-resistant protective layer for use in the present invention are silicone resin, fluoroplastic, polyimide resin, epoxy resin, phenolic resin, melamine resin and nitrocellulose.

When a heat source, which can selectively heat a spot of the ink layer, such as a laser beam, is employed, there will be no limitation to the thickness of the substrate.

The coloring agent contained in the ink layer for use in the present invention can be appropriately selected from carbon black, organic pigments, inorganic pigments and dyes in compliance with the requests for the color tone of images.

The ink layer of the thermal image transfer recording medium according to the present invention comprises a copolymer of acrylonitrile and/or methacrylonitrile, and at least one comonomer of the previously mentioned formula (I).

Examples of the comonomer used in forming a copolymer together with the acrylonitrile or methacrylonitrile are methyl methacrylate, methyl acrylate, ethyl methacrylate, ethyl acrylate, n-butyl methacrylate, glycidyl methacrylate, glycidyl acrylate, 2-hydroxyethyl methacrylate, isobutyl methacrylate, tert-butyl methacrylate and 2-hydroxypropyl methacrylate.

Examples of the thus formed copolymers are acrylonitrile - methyl methacrylate, acrylonitrile - methyl acrylate, acrylonitrile - ethyl methacrylate, acrylonitrile - ethyl acrylate, acrylonitrile - n-butyl methacrylate, acrylonitrile - glycidyl methacrylate, acrylonitrile -glycidyl acrylate, acrylonitrile- 2-hydroxyethyl methacrylate, acrylonitrile - isobutyl methacrylate, acrylonitrile - tert-butyl methacrylate, acrylonitrile -2-hydroxypropyl methacrylate, methacrylonitrile - methyl methacrylate, methacrylonitrile - methyl acrylate, methacrylonitrile - ethyl methacrylate, methacrylonitrile -ethyl acrylate, methacrylonitrile - n-butyl methacrylate, methacrylonitrile - glycidyl methacrylate, methacrylonitrile - glycidyl acrylate, methacrylonitrile - 2-hydroxyethyl methacrylate, methacrylonitrile - isobutyl methacrylate, methacrylonitrile - tert-butyl methacrylate, and methacrylonitrile - 2-hydroxypropyl methacrylate.

Among the above copolymers, acrylonitrile-glycidyl methacrylate, acrylonitrile-methyl methacrylate and acrylonitrile-ethyl methacrylate are particularly superior to others, because their heat-, chemical- and friction-resistant properties are excellent, and further they can be easily manufactured.

Besides the above bipolymers, terpolymers can be employed by selecting a monomer from the groups A, B and C, respectively:

Group A: acrylonitrile and methacrylonitrile.
Group B: (meth)acrylic acid ester monomers represented by the following formula (II);

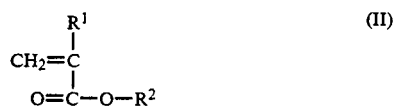
(II)

wherein $R^1$ represents hydrogen or a methyl group; and $R^2$ represents hydrogen, a straight-chain or branched alkyl group having 1 to 4 carbon atoms, or a hydroxyalkyl group having 2 to 4 carbon atoms.

Group C: glycidyl acrylate and glycidyl methacrylate.

Each comonomer of Group A, B or C has the following functions:

Group A: imparting the chemical-resistant and heat-resistant properties to the ink layer, and increasing the mechanical strength of the ink layer.

Group B: imparting thermal plasticity and chemical-resistant properties to the ink layer, and controlling the glass transition temperature (Tg) of the ink layer.

Group C: increasing the adhesion property of the ink layer to the substrate, promoting the crosslinking performance and imparting the heat-resistant property to the ink layer.

When the above-mentioned terpolymer is employed in the ink layer of the thermal image transfer recording medium according to the present invention, it is preferable that the composition ratio of the comonomers in the terpolymer be in the following range:

[(meth)acrylonitrile] : [(meth)acrylic acid ester] : [glycidyl (meth)acrylate] = (10 to 70) : (0 to 80) : (0 to 80)

When the terpolymer whose comonomer composition ratio is within the above range is employed in the ink layer, the thermal image transfer recording medium according to the present invention can exhibits sufficient mechanical strength and high chemical-resistant properties. In addition, the ink layer of the recording medium has the advantage in that it has no curling problem.

Depending on the molecular weight of the copolymer employed in the ink layer, the melt viscosity thereof varies, which affects the thermosensitivity of the thermal image transfer recording medium in the course of thermal printing. From the viewpoint of the thermosensitivity of the thermal image transfer recording medium, it is preferable that the weight-average molecular weight (Mw) of the copolymer on a basis of acrylonitrile or methacrylonitrile for use in the present invention be in the range of 2,000 to 1,000,000, more preferably in the range of 3,000 to 500,000. With respect to the number-average molecular weight (Mn), it is preferable that the above-mentioned copolymer employed have a number-average molecular weight ranging from 1,000 to 500,000, and more preferably ranging from 1,500 to 250,000. The above-mentioned weight-average molecular weight (Mw) and number-average molecular weight (Mn) are represented in terms of the respective values converted to polystyrene by gel permeation chromatography (GPC).

The foregoing copolymers can be easily obtained by the conventional methods. For example, the above-mentioned monomers are polymerized in a solvent at an appropriate temperature in the presence of a radical polymerization initiator such as benzoyl peroxide and azobisisobutyro-nitrile. For obtaining the copolymers, the conventional emulsion polymerization method can be employed.

When a copolymer having curable functional groups prepared by use of glycidyl methacrylate is employed, an appropriate thermosetting agent may be added to the composition of the ink layer Representative examples of the above-mentioned thermosetting agents are phenolics, such as phenolic resin; primary amine; secondary amine; complex compounds of amine, such as complex compounds of amine and Lewis acids, in particular, borontrifluoride, just like in the form of $BF_3 \cdot C_2H_5 \cdot NH_2$; organic acids and organic acid anhydrides.

Stoichiometrically, the thermosetting agent may be added to the composition of the ink layer in an amount chemically equivalent to the amount of the glycidyl groups contained in the copolymer employed in the ink layer.

Furthermore, the friction and scratch resistance, heat resistance and chemical resistance of the thermal image transfer recording medium can be improved by use of a copolymer in the ink layer, which is prepared from (a) a monomer from the Group A, (b) a monomer from the Group B and (c) a monomer from the Group C, with at least part of the glycidy groups thereof being modified by alkanolamine. It is more preferable that the above-mentioned copolymer be used together with a blocked isocyanate in the ink layer.

An example of the above copolymer is represented by the following formula (III):

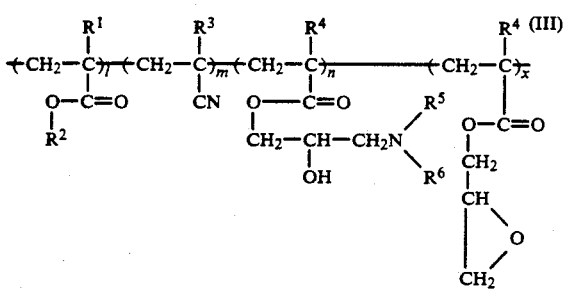

wherein $R^1$, $R^2$, $R^3$ and $R^4$ each represent hydrogen or $CH_3$; $R^5$ represents hydrogen or a straight-chain or branched alkyl group having 1 to 4 carbon atoms, which is substituted by a hydroxyl group; and $R^6$ represents a straight-chain or branched alkyl group having 1 to 4 carbon atoms, which is substituted by a hydroxyl group.

When the above-mentioned copolymer of the formula (III) is employed in the ink layer of the thermal image transfer recording medium according to the present invention, it is preferable that the composition ratio by weight of (1):(m):(n):(x) be in the range (20 to 80%) : (10 to 50%) : (1 to 40%) : (0 to 50%), and more preferably in the range of (40 to 60%) : [20 to 40%) : (10 to 30%) : (0 to 30%).

When the copolymer whose comonomer composition ratio is within the above range is employed in the ink layer, the obtained thermal image transfer recording medium according to the present invention exhibits sufficient mechanical strength and high chemical-resistant properties. In addition, the ink layer of the recording medium is sufficiently flexible.

Depending on the molecular weight of the copolymer of formula (III) employed in the ink layer, the melt viscosity thereof varies, which affects the thermosensitivity of the thermal image transfer recording medium in the course of thermal printing. From the viewpoint of the thermosensitivity of the thermal image transfer recording medium, it is preferable that the copolymer of formula (III) have a weight-average molecular weight(Mw) ranging from 3,000 to 20,000 and a number-average molecular weight (Mw) ranging from 1,500 to 100,000, which are each represented in terms of the values converted to polystyrene by gel permeation chromatography (GPC).

The above-mentioned copolymer of formula (III) can be obtained by a conventional method including two steps.

At the first step, polymerization is carried out in a solvent at an appropriate temperature in the presence of a polymerization initiator such as benzoyl peroxide and azobisisobutyronitrile.

At the second step, at least part of glycidyl methacrylate is modified by alkanolamine. After the removal of unreacted monomers, ring opening reaction is initiated in such a manner that the glycidyl groups contained in the copolymer are allowed to react with alkanolamine in such a range that the amount of the alkanolamine is equimolar to that of the glycidyl groups in the copolymer.

Examples of the alkanolamine for use in the present invention are monoethanolamine and diethanolamine. From the viewpoint of reactivity, diethanolamine is preferable for use in the present invention.

By controlling the amount of the alkanolamine to be reacted for modification at the second step of the preparation of the copolymer, glycidyl methacrylate units can be partially remained as they are in the modified copolymer, so that the advantages of the glycidyl group can also be efficiently utilized in the recording layer. More specifically, when both of the glycidyl groups and the alkanolamine-modified groups exist in the copolymer at the same time, the advantages of the glycidyl groups, such as improved adhesion strength of the ink composition to a transferred sheet, high glass transition temperature (Tg) and excellent crosslinking properties, can coexist with the advantages of the alkanolamine-modified group, such as good flexibility of the ink layer and excellent reactivity with isocyanate.

When the above-mentioned copolymer is employed, the previously mentioned thermosetting agent may be contained in the ink layer.

The glycidyl group modified by alkanolamine exhibits excellent reactivity with isocyanate, because the characteristics of amine are imparted thereto by the modification so that the crosslinking thermosetting reaction can proceed smoothly.

The above-mentioned blocked isocyanate, serving as a crosslinking agent in this reaction, will now be explained in detail.

The blocked isocyanate, whose isocyanate group is protected therein, does not set during storage, and accordingly the thermosensitivity thereof does not deteriorate.

Examples of isocyanate for use in the present invention are tolylene diisocyanate, diphenylmethane diisocyanate, isophorone diisocyanate, a dimer and a trimer of tolylene diisocyanate, hexamethylene diisocyanate, and an adduct of 2,4-tolylene diisocyanate with trimethylolpropane. As a blocking agent used for the blocked isocyanate, phenol, acetylacetone, caprolactone and oxime can be employed. Among them, oxime-type blocking agents are preferable from the viewpoint of the dissociation temperature and the stability at room temperature.

It is preferable that the above blocked isccyanate be contained in the ink layer composition in an equimolar amount to or in an amount of about 10% more than that of the hydroxyl groups in glycidyl-methacrylate-modified alcohol.

The crosslinking reaction of the above-mentioned isocyanate and the glycidyl group itself also proceeds with the formation of oxazolidone rings. This reaction is described in detail in M. E. Dyen; D. Swern: Chem. Rev. 67, 197(1967).

The present invention will now be explained in detail by referring to the lubricating properties-imparting agent.

The lubricating properties-imparting agent improves the lubricating properties of the surface of images thermally transferred on the recording sheet. The more improved the lubricating properties of the surface of the images, the lower the friction coefficient thereof when the images are brought into contact with the objects such as metal, corrugated board and wood. The lubricating properties-imparting agent has a function of preventing the stress from being concentrated at a spot of the transferred images.

Examples of the lubricating properties-imparting agents for use in the present invention are lubricants such as wax-type fatty amide and phosphate ester; waxes such as natural paraffin wax, candelilla wax and carnauba wax; oils such as silicone oil and perfluoroalkyl ether; resins such as silicone resin, fluoroalkyl ether resin; and lubricity-providing particles such as polytetrafluoroethylene (PTFE), SiO and $SiO_2$. Among the above, carnauba wax is the most effective because it gives both mechanical strength and lubricating properties well-balancedly to the ink composition.

It is preferable that the amount of the lubricating properties-imparting agent be in the range of 1 to 30 wt. % of the amount of the aforementioned copolymer.

As a matter of course, the above lubricating properties-imparting agent may be added to the composition of the ink layer. The agent can further exert its effect when a lubricating properties-imparting agent layer comprising the above lubricating properties-imparting agent is independently interposed between the substrate and the ink layer. In this case, paraffin wax and carnauba wax are the most preferable. If carnauba wax is employed in the lubricating properties-imparting agent layer, the lubricating properties-imparting agent layer may be as thick as 0.3 to 2.0 μm.

Furthermore, additive components such as a flexibility-providing agent, a thermosensitivity-controlliding agent and wear-resistance improving agent can be added to the composition for the ink layer. For example, the flexibility-providing agent such as dioctylphthalate (DOP); the thermosensitivity-controlling agent such as ethylene - vinyl acetate copolymer (EVA), ethylene - ethyl acrylate copolymer (EEA) or synthetic rubber; and the wear-resistance improving agent such as thermoplastic resins of acrylic resin and polyester resin can be contained in the ink layer composition.

The thickness of the ink layer may be appropriately adjusted depending on the surface smoothness of the recording sheet employed. When a polyester film, which has a remarkably smooth surface, is used as the recording sheet, the 1.0 to 2.5-μm-thick ink layer is thick enough to produce the images invulnerable to friction and scratch, with sufficient thermosensitivity being maintained. When coated paper or high-quality paper is employed, the thickness of the ink layer may be set in the range of about 2.5 to 4.0 μm from the viewpoint of the image quality. Furthermore, in the case where a thermosensitivity-promoting agent layer, to be described later, is formed on the ink layer, it is preferable that the thickness of the ink layer be in the range of about 1.5 to 3.0 μm.

The present invention will be now explained in detail by referring to an adhesion-promoting agent layer.

In order to prevent the ink layer from falling off the substrate in the course of operation at low temperatures, for example, at 0° C., the above-mentioned adhesion-promoting agent layer can be provided. More specifically, in the case where the thermal image transfer recording medium type (1) according to the present invention is employed, the adhesion-promoting agent layer can be interposed between the substrate and the ink layer. When the thermal image transfer recording medium type (2) is employed, the adhesion-promoting agent layer can be interposed between the substrate and the lubrication properties-imparting agent layer. In any case, the adhesion-promoting agent layer may be transferred to the recording sheet together with the ink layer, or left on the substrate after thermal image transfer.

The materials which have a tendency to show flexibility at room temperatures are suitable for the adhesion-promoting agent. Examples of the adhesion-promoting agents for use in the present invention are resins such as ethylene - vinyl acetate copolymer, ethylene - ethyl acrylate copolymer, ethylene - vinyl chloride copolymer, polyvinyl butyral, natural rubber, and synthetic rubber.

When the adhesion-promoting agent layer is designed to be transferred to the recording sheet, it is recommendable that some waxes having an appropriate melting point, such as paraffin wax and carnauba wax may be mixed together with the above-mentioned adhesion-promoting agent, in an amount ratio of 30 to 70 wt. %. It is preferable that the thickness of the adhesion-promoting agent layer be in the range of 0.2 to 1.0 μm.

The present invention will now be explained in detail by referring to a thermosensitivity-promoting agent layer.

The above-mentioned thermal image transfer recording media according to the present invention are capable of producing transferred images having improved friction and scratch-resistance and heat-resistance. To obtain further clear images, for instance, fine lines free from partial omission and dense solids, increased thermal energy is required to apply to the thermal image transfer recording medium. If thermal-printing is performed by using a commercially available printer under application of a platen pressure of 150 g/cm$^2$ at a printing speed of 10 cm/sec, clear images can be obtained on a highly smooth recording sheet such as a film sheet when a thermal energy of 20 mJ/mm$^2$ is delivered to the recording medium. In contrast, clear images cannot be obtained on a less smooth recording sheet such as mirror-coat paper until an energy attains no less than 25 mJ/mm$^2$.

With the above taken into consideration, the thermosensitivity-promoting agent layer can be provided on the ink layer. By the aid of the thermosensitivity-promoting agent layer, the thermosensitivity of the ink layer is improved, with the friction and scratch-resistance and heat-resistance substantially maintained.

The thermosensitivity-promoting agent layer for use in the present invention comprises as the main components a thermofusible material and/or a heat-softening material.

The preferable thermofusible material has a melting point of 60° to 130° C., and shows a melt viscosity of 1000 cps or less at 140° C. Specific examples of the above thermofusible materials for use in the present invention are waxes such as paraffin wax, carnauba wax, candelilla wax and polyethylene wax; and fatty amide. The heat-softening materials which have high adhesion properties to a recording sheet are preferable, and examples of the heat-softening materials for use in the present invention are ethylene - vinyl acetate copolymer, ethylene - ethyl acrylate copolymer, acrylic resin, and polyester resin, in particular branched polyester resin.

The thermosensitive-promoting agent layer can exert its effect sufficiently when the above-listed heat-softening material is employed alone, but to meet the further requirements for the improvement in the surface properties of the recording medium, the increase in printing speed, and the improvement of image quality even on a recording sheet having a low surface-smoothness, the above-mentioned thermofusible materials may be mixed with the heat-softening material.

On the other hand, when the thermofusible material is employed alone in the thermosensitivity-promoting agent layer, it can function as a thermosensitivity-promoting agent in the case where the employed recording sheet has relatively low surface smoothness. However, as the surface smoothness of the employed recording sheet is getting higher, the obtained images become poor in the friction and scratch resistance. For example, the transferred images become vulnerable to the friction and scratch by a stainless steel edge and a pencil with a hardness of 2H, to be described later. In such a case, therefore, the thermofusible material and the heat-softening material may be used in combination.

The melt viscosity of the thermosensitivity-promoting agent, which determines the thermosensitivity of the recording medium, are preferably in the range of 50 to 5000 cps at 140° C., when measured by a B-type rotational viscometer. It is preferable that the mixing ratio of the thermofusible material and heat-softening material be in the range of (95 to 5) to (0 to 100).

When the employed recording sheet has relatively high surface smoothness, the thermosensitivity-promoting agent layer is preferably as thin as possible, as far as the thermosensitivity-promoting agent layer can bear the adhesion to the ink layer and the mechanical strength thereof is not deteriorated. In contrast to this, when images are transferred on the recording sheet with low surface smoothness, it is recommended that the thermosensitivity-promoting agent layer be designed as thick as possible, as far as the thermosensitivity thereof is not deteriorated, so that satisfactory thermal image transfer performance of the ink layer can be maintained in spite of unsmoothness of the recording sheet. From the above viewpoints, it is preferable that the thickness of the thermosensitivity-promoting agent layer for use in the present invention be in the range of 0.1 to 1.5 $\mu$m, more preferably in the range of 0.3 to 1.0 $\mu$m.

Other features of this invention will become apparent in the course of the following description of exemplary embodiments, which are given for illustration of the invention and are not intended to be limiting thereof.

EXAMPLE 1

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - acrylonitrile copolymer (weight ratio = 70:30) [Mw = 6400, Mn = 3600] | 70 |
| Lubricating properties-imparting agent: Carnauba wax | 10 |

The thus prepared ink layer coating liquid was coated on a polyester film serving as a substrate with a thickness of 4.5 $\mu$m in a deposition amount of 3.0 $\mu$m on a dry basis, and dried, whereby a thermal image transfer recording medium No. 1 according to the present invention was obtained.

EXAMPLE 2

The procedure for Example 1 was repeated except that methyl methacrylate - acrylonitrile copolymer employed in the ink layer coating liquid in Example 1 was replaced by the following copolymer, whereby a thermal image transfer recording medium No. 2 according to the present invention was obtained.

Copolymer: Methyl methacrylate - acrylonitrile (weight ratio=50 : 50) [Mw=7700, Mn=4100]

EXAMPLE 3

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - acrylonitrile copolymer (weight ratio = 70:30) [Mw = 6400, Mn = 3600] | 76 |
| Lubricating properties-imparting agent: Silicone oil | 4 |

The thus prepared ink layer coating liquid was coated on a polyester film serving as a substrate with a thickness of 4.5 $\mu$m, in a deposition amount of 3.0 $\mu$m on a dry basis, and dried, whereby a thermal image transfer recording medium No. 3 according to the present invention was obtained.

EXAMPLE 4

Formation of Lubricating Properties-imparting Agent Layer

A mixture of carnauba wax and paraffin wax at a mixing ratio by weight of 1:1 was dispersed in toluene to prepare a lubricating properties-imparting agent layer coating liquid.

The thus prepared lubricating properties-imparting agent layer coating liquid was coated on a polyester film serving as a substrate with a thickness of 4.5 $\mu$m, in a deposition amount of 1.0 $\mu$m on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - acrylonitrile copolymer (weight ratio = 70:30) [Mw = 6400, Mn = 3600] | 70 |

The thus prepared ink layer coating liquid was coated on the above-prepared lubricating properties-imparting agent layer, in a deposition amount of 2.5 μm on a dry basis, and dried, whereby a thermal image transfer recording medium No. 4 according to the present invention was obtained.

EXAMPLE 5

Formation of Adhesion-promoting Agent Layer

A mixture of ethylene - vinyl acetate copolymer having a melt index of 150 (40% of vinyl acetate) and carnauba wax at a mixing ratio by weight of 1:1 was dispersed in toluene to prepare an adhesion-promoting agent layer coating liquid.

The thus prepared adhesion-promoting agent layer coating liquid was coated on a polyester film serving as a substrate with a thickness of 4.5 μm, in a deposition amount of 0.5 μm on a dry basis, and dried, so that an adhesion-promoting agent layer was formed on the substrate.

Formation of Ink Layer

A mixture of the following components was dispersed in methyl ethyl ketone to prepare an ink layer coating liquid containing a solid portion of 20%:

|  | Parts by Weight |
| --- | --- |
| Coloring agent: Carbon black | 20 |
| Copolyer: Methyl methacrylate - acrylonitrile copolymer (weight ratio = 70:30) [Mw = 6400, Mn = 3600] | 70 |
| Lubricating properties-imparting agent: Carnauba wax | 10 |

The thus prepared ink layer coating liquid was coated on the above-prepared adhesion-promoting agent layer, in a deposition amount of 2.5 μm on a dry basis, and dried, whereby a thermal image transfer recording medium No. 5 according to the present invention was obtained.

Even when the thus obtained thermal image transfer recording medium No. 5 was crumpled, the ink composition hardly fell off the recording medium and the adhesion promoting effect was confirmed.

EXAMPLE 6

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - acrylonitrile copolymer (weight ratio = 70:30) [Mw = 6400, Mn = 3600] | 57 |
| Additive agents: | |
| Flexibility-providing agent: Styrene butadiene rubber | 3 |
| Thermosensitivity-controlling agent: Linear polyester resin | 10 |
| Lubricating properties-imparting agent: Carnauba wax | 10 |

The thus prepared ink layer coating liquid was coated on a polyester film serving as a substrate with a thickness of 4.5 μm, in a deposition amount of 3.0 μm on a dry basis, and dried, whereby a thermal image transfer recording medium No. 6 according to the present invention was obtained.

EXAMPLE 7

The procedure for Example 1 was repeated except that methyl methacrylate - acrylonitrile copolymer employed in the ink layer coating liquid in Example 1 was replaced by the following copolymer, whereby a thermal image transfer recording medium No. 7 according to the present invention was obtained.

Copolymer: Glycidyl methacrylate - acrylonitrile (weight ratio=50 : 50) [Mw=8000, Mn=3900]

EXAMPLE 8

The procedure for Example 1 was repeated except that methyl methacrylate - acrylonitrile copolymer in the ink layer coating liquid employed in Example 1 was replaced by the following copolymer, whereby a thermal image transfer recording medium No. 8 according to the present invention was obtained.

Copolymer: Glycidyl methacrylate - methacrylonitrile (weight ratio=60 : 40) [Mw=10000, Mn=4900]

COMPARATIVE EXAMPLE 1

Formation of Ink Layer

A mixture of the following components was dispersed in toluene to prepare an ink layer coating liquid containing 15% of solid components:

|  | Parts by Weight |
| --- | --- |
| Coloring agent: Carbon black | 20 |
| Binders: | |
| Paraffin wax (melting point of 68° C.) | 40 |
| Carnauba wax (melting point of 81° C.) | 20 |
| Ethylene - vinyl acetate copolymer (28% of vinyl acetate) [melt index = 250] | 10 |

The thus prepared ink layer coating liquid was coated on a polyester film serving as a substrate with a thickness of 4.5 μm, in a deposition amount of 3.0 μm on a dry basis, and dried, whereby a comparative thermal image transfer recording medium No. 1 was obtained.

COMPARATIVE EXAMPLE 2

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Binders: Bisphenol A type-epoxy resin (Trademark "Epicote 1002" made by Yuka Shell Epoxy K.K.) (softening point of 77 to 78° C.) [disclosed in Japanese Patent Publication 60-59159] | 80 |

The thus prepared ink layer coating liquid was coated on a polyester film serving as a substrate with a thickness of 4.5 μm, in a deposition amount of 3.0 μm on a dry basis, and dried, whereby a comparative thermal image transfer recording medium No. 2 was obtained.

The above-prepared thermal image transfer recording media No. 1 to No. 8 according to the present invention and comparative thermal image transfer recording media No. 1 and No. 2 were subjected to a printing test under the following conditions:

Recording sheet:
(1) a label-type polyester film (PET) with the back thereof treated to be adhesive, and further a release backing paper attached thereto
(2) coated paper (mirror-coat paper)

Thermal head : a thin-film type thermal head partially having a glaze layer
Platen pressure : 150 g/cm$^2$
Peel-off angle of thermal image transfer recording medium : 30° away from a recording sheet
Peel-off torque : 200 g
Applied energy : 10 to 30 mJ/mm$^2$
Printing speed : 10 cm/sec The following characteristics were measured and evaluated in the course of the printing test.

Thermosensitivity: Represented by the minimum applied energy at which fine lines transferred to the mirror-coat paper did not become blurred.

Friction resistance at high temperatures: Each printed sample was placed on a glass plate in a container where the temperature was maintained at 70° C. The printed sample was subjected to a reciprocating rubbing test by rubbing the printed surface of the sample with corrugated cardboard at a speed of 30 cm/sec, with a load of 60 g/cm$^2$ applied thereto. This characteristic was represented by the number of rubbings at which images became illegible.

Scratch resistance to a pencil with a hardness of 2H Each printed sample was rubbed by a pencil with a hardness of 2H, with a load of about 1 t/cm$^2$ applied thereto. This characteristic was represented by the number of rubbings at which printed images were scraped off the recording sheet and the recording sheet was exposed.

Scratch resistance to a stainless steel edge Each printed sample was rubbed by a stainless steel edge, with a load of about 1 t/cm$^2$ applied thereto. This characteristic was represented by the number of rubbing at which printed images were scraped off the recording sheet and the recording sheet was exposed.

Chemical-resistance Each printed sample in which images were formed on a PET film was rubbed by a cotton swab with 0.5 ml of each chemical, as listed below, absorbed, with a load of 10 g/mm$^2$ applied thereto. This characteristic was represented by the number of rubbing at which printed images were scraped off the recording sheet and the recording sheet was exposed.

Chemicals

1. Ethanol
2. Brake oil
3. Kerosine
4. Compound-containing car wax
5. Toluene
6. Xylene
7. "Perchlene" for dry cleaning

TABLE 1

| Example No. Test Items | Example | | | | | | | | Comparative Example | |
|---|---|---|---|---|---|---|---|---|---|---|
|  | 1 | 2 | 3 | 4 | 5 | 6 | 7 | 8 | 1 | 2 |
| Thermosensitivity (mJ/mm$^2$) | 25 | 26 | 25 | 24 | 26 | 25 | 24 | 25 | 18 | 28 |
| Friction resistance at high temperature (70° C.) | | | | | | | | | | |
| PET | >100 | >100 | >100 Appearance of scars | >100 | >100 | >100 | >100 | >100 | 1 | >100(*) Appearance of stain and scars |
| Coated paper | >100 | >100 | >100 Appearance of scars | >100 | >100 | >100 | >100 | >100 | 1 | (*) The same as above |
| Scratch resistance to a pencil with a hardness of 2H | | | | | | | | | | |
| PET | >100 | >100 | 92 | >100 | 83 | >81 | >100 | >100 | 1 | 1 |
| Coated paper | >100 | >100 | 98 | >100 | 87 | >89 | >100 | >100 | 1 | 4 |
| Scratch resistance to a stainless steel edge | | | | | | | | | | |
| PET | >100 | >100 | 86 | >100 | 78 | >65 | >100 | >100 | 1 | 1 |
| Coated paper | >100 | >100 | 95 | >100 | 84 | >78 | >100 | >100 | 1 | 1 |
| Chemical-resistance | | | | | | | | | | |
| 1 | >100 | >100 | >100 | >100 | >100 | >100 | >100 | >100 | 25 | 36 |
| 2 | >100 | 97 | 91 | >100 | 89 | 93 | >100 | >100 | 13 | 21 |

TABLE 1-continued

| Example No. | Example | | | | | | | | Comparative Example | |
|---|---|---|---|---|---|---|---|---|---|---|
| Test Items | 1 | 2 | 3 | 4 | 5 | 6 | 7 | 8 | 1 | 2 |
| 3 | >100 | >100 | >100 | >100 | >100 | >100 | >100 | >100 | 3 | 38 |
| 4 | >100 | >100 | >100 | >100 | >100 | >100 | >100 | >100 | 5 | 25 |
| 5 | 63 | 54 | 58 | 60 | 59 | 46 | >89 | >92 | 1 | 3 |
| 6 | 69 | 62 | 60 | 68 | 64 | 57 | >100 | >100 | 3 | 5 |
| 7 | 51 | 40 | 55 | 48 | 57 | 51 | >72 | >81 | 3 | 3 |

(*)The corrugated board did not move on printed images smoothly because of their poor lubricating properties.

EXAMPLE 9

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - methacrylonitrile - glycidyl acrylate (weight ratio = 55:25:20) [Mw = 6100, Mn = 3200) | 70 |
| Lubricating properties-imparting agent: Carnauba wax | 10 |

The thus prepared ink layer coating liquid was coated on a polyester film serving as a substrate with a thickness of 4.5 μm, in a deposition amount of 3.0 μm on a dry basis, and dried, whereby a thermal image transfer recording medium No. 9 according to the present invention was obtained.

EXAMPLE 10

The procedure for Example 9 was repeated except that methyl methacrylate - methacrylonitrile - glycidyl acrylate in the ink layer coating liquid employed in Example 9 was replaced by the following terpolymer, whereby a thermal image transfer recording medium No. 10 according to the present invention was obtained.

Copolymer Methyl methacrylate - acrylonitrile - glycidyl methacrylate (weight ratio by weight = 45 : 30 : 25) [Mw = 6900, Mn = 3800)

EXAMPLE 11

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - methacrylonitrile - glycidyl acrylate (weight ratio = 55:25:20) [Mw = 6100, Mn = 3200) | 70 |
| Lubricating properties-imparting agent: Carnauba wax | 10 |
| Thermosetting agent $BF_3 \cdot C_2H_5NH_2$ | 1.5 |

The thus prepared ink layer coating liquid was coated on a polyester film serving as a substrate with a thickness of 4.5 μm, in a deposition amount of 3.0 μm on a dry basis, and dried, whereby a thermal image transfer recording medium No. 11 according to the present invention was obtained.

EXAMPLE 12

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - methacrylonitrile - glycidyl acrylate (weight ratio = 55:25:20) [Mw = 6100, Mn = 3200) | 76 |
| Lubricating properties-imparting agent: Silicone oil | 4 |

The thus prepared ink layer coating liquid was coated on a polyester film serving as a substrate with a thickness of 4.5 μm, in a deposition amount of 3.0 μm on a dry basis, and dried, whereby a thermal image transfer recording medium No. 12 according to the present invention was obtained.

EXAMPLE 13

Formation of Lubricating Properties-Imparting Agent Layer

Carnauba wax was dispersed in toluene to prepare a lubricating properties-imparting agent layer coating liquid.

The thus prepared lubricating properties-imparting agent layer coating liquid was coated on a polyester film serving as a substrate with a thickness of 4.5 μm, in a deposition amount of 1.0 μm on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - methacrylonitrile - glycidyl acrylate (weight ratio = 55:25:20) [Mw = 6100, Mn = 3200) | 70 |

The thus prepared ink layer coating liquid was coated on the above-prepared lubricating properties-imparting agent layer, in a deposition amount of 2.5 μm on a dry basis, and dried, whereby a thermal image transfer recording medium No. 13 according to the present invention was obtained.

EXAMPLE 14

Formation of Lubricating Properties-Imparting Agent Layer

Carnauba wax was dispersed in toluene to prepare a lubricating properties-imparting agent layer coating liquid.

The thus prepared lubricating properties-imparting agent layer coating liquid was coated on a polyester film serving as a substrate with a thickness of 4.5 $\mu$m, in a deposition amount of 1.0 $\mu$m on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - methacrylonitrile - glycidyl acrylate (weight ratio = 55:25:20) [Mw = 6100, Mn = 3200) | 70 |
| Thermosetting agent: $BF_3 \cdot C_2H_5NH_2$ | 1.5 |

The thus prepared ink layer coating liquid was coated on the above-prepared lubricating properties-imparting agent layer in a deposition amount of 2.5 $\mu$m on a dry basis, and dried, whereby a thermal image transfer recording medium No. 14 according to the present invention was obtained.

EXAMPLE 15

Formation of Adhesion-promoting Agent Layer

A mixture of ethylene - vinyl acetate copolymer having a melt index of 150 (40% of vinyl acetate) and carnauba wax at a mixing ratio by weight of 1:1 was dispersed in toluene to prepare an adhesion-promoting agent layer coating liquid.

The thus prepared adhesion-promoting agent layer coating liquid was coated on a polyester film serving as a substrate with a thickness of 4.5 $\mu$m, in a deposition amount of 0.3 $\mu$m on a dry basis, and dried, so that an adhesion-promoting agent layer was formed on the substrate.

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - acrylonitrile copolymer (weight ratio = 70:30) [Mw = 6400, Mn = 3600] | 70 |
| Lubricating properties-imparting agent: Carnauba wax | 10 |

The thus prepared ink layer coating liquid was coated on the above-prepared adhesion-promoting agent layer, in a deposition amount of 2.5 $\mu$m on a dry basis, and dried, whereby a thermal image transfer recording medium No. 15 according to the present invention was obtained.

When the thus obtained thermal image transfer recording medium No. 15 was crumpled, the ink composition hardly fell off the recording medium and the adhesion promoting effect was confirmed.

EXAMPLE 16

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - methacrylonitrile - glycidyl acrylate (weight ratio = 55:25:20) [Mw = 6100, Mn = 3200) | 57 |
| Additive agents: |  |
| Flexibility-providing agent; Styrene butadiene rubber | 3 |
| Thermosensitivity-controlling agent; Linear polyester resin | 10 |
| Lubricating-properties imparting agent: Carnauba wax | 10 |

The thus prepared ink layer coating liquid was coated on a polyester film serving as a substrate with a thickness of 4.5 $\mu$m, in a deposition amount of 3.0 $\mu$m on a dry basis, and dried, whereby a thermal image transfer recording medium No. 16 according to the present invention was obtained.

EXAMPLE 17

The procedure for Example 7 was repeated except that glycidyl methacrylate - acrylonitrile copolymer employed in the ink layer coating liquid in Example 7 was replaced by the following terpolymer, whereby a thermal image transfer recording medium No. 17 according to the present invention was obtained.

Copolymer: Glycidyl methacrylate - acrylonitrile -2-hydroxyethyl methacrylate (weight ratio=50:40:10) [Mw=20000, Mn=10000]

The above-prepared thermal image transfer recording media No. 9 to No. 17 were subjected to the same printing test under the same conditions, as previously mentioned.

The following characteristics were measured and evaluated in the course of the printing test.

Thermosensitivity: Represented by the minimum applied energy at which fine lines transferred to the mirror-coat paper did not become blurred.

Friction resistance at high temperatures: Each printed sample was placed on a glass plate in a container where the temperature was maintained at 100° C. The printed sample was subjected to a reciprocating rubbing test by rubbing the printed surface of the sample with corrugated cardboard at a speed of 30 cm/sec, with a load of 60 g/cm$^2$ applied thereto. This characteristic was represented by the number of rubbings at which printed images became illegible.

Scratch resistance to a pencil with a hardness of 2H Each printed sample was rubbed by a pencil with a hardness of 2H, with a load of about 1 t/cm$^2$ applied thereto. This characteristic was represented by the number of rubbings at which printed images were scraped off the recording sheet and the recording sheet was exposed.

Scratch resistance to a stainless steel edge Each printed sample was rubbed by a stainless steel edge, with a load of about 1 t/cm² applied thereto. This characteristic was represented by the number of rubbings at which printed images were scraped off the recording sheet and the recording sheet was exposed.

Steam-iron resistance: Each printed sample was covered with a cotton cloth, with the image recorded surface thereof in contact with the cloth. A steam-iron thermostatically controlled at 150° C. was pressed on the cotton cloth for 10 seconds, under the application of a pressure of 100 g/cm². According to the following scale, the rank of the steam-iron resistance of the printed images was determined by visual evaluation.

Estimating Scale

5 ←—4—→ 3 ←—2—→ 1

Heat-resistance: A Teflon-tape was attached to the edge of an iron thermostatically controlled at 200° C. Each printed sample was rubbed by the above iron with a load of 300 g/cm² applied thereto. This characteristic is represented by the number of rubbings at which the images on the printed sample became illegible.

Chemical-resistance: Each printed sample in which images were formed on a PET film was rubbed by a cotton swab with 0.5 ml of each chemical, as listed below, absorbed, with a load of 10 g/mm² applied thereto. This characteristic is represented by the number of rubbings at which printed images were scraped off the recording sheet and the recording sheet was exposed.

Chemicals 1. ethanol
2. brake oil
3. kerosine
4. compound-containing car wax
5. toluene
6. xylene
7. "Perchlene" for dry cleaning

TABLE 2

| Example No. Test Items | Example | | | | | | | | |
|---|---|---|---|---|---|---|---|---|---|
| | 9 | 10 | 11 | 12 | 13 | 14 | 15 | 16 | 17 |
| Thermosensitivity (mJ/mm²) | 23 | 25 | 23 | 23 | 21 | 21 | 25 | 21 | 23 |
| Friction resistance at high temperature (100° C.) | | | | | | | | | |
| PET | No change after 100 cycles of rubbing | Appearance of slight stain after 100 cycles of rubbing | No change after 100 cycles of rubbing | Appearance of scars after 100 cycles of rubbing | No change after 100 cycles of rubbing | No change after 100 cycles of rubbing | Appearance of slight stain after 100 cycles of rubbing | Appearance of slight stain after 100 cycles or rubbing | Appearance of scars after 100 cycles of rubbing |
| Coated paper | The same as above | The same as above | The same as above | The same as above | The same as above | The same as above | The same as above | The same as above | The same as above |
| Scratch resistance to a pencil with a hardness of 2H | | | | | | | | | |
| PET | >100 | 92 | >100 | 68 | >100 | >100 | 85 | 74 | >100 |
| Coated paper | >100 | >100 | >100 | 83 | >100 | >100 | 91 | 78 | >100 |
| Scratch resistance to a stainless steel edge | | | | | | | | | |
| PET | 85 | 76 | 88 | 56 | 96 | 95 | 72 | 61 | 76 |
| Coated paper | 79 | 90 | 81 | 39 | 85 | 84 | 75 | 63 | 72 |
| Steam-iron resistance | | | | | | | | | |
| PET | 4 | 4 | 4 | 3 | 4 | 4 | 3 | 3 | 4 |
| Coated paper | 3 | 3 | 4 | 3 | 3 | 4 | 3 | 3 | 4 |
| Heat-resistance | | | | | | | | | |
| PET | 46 | 41 | 53 | 39 | 55 | 57 | 38 | 41 | 38 |
| Coated paper | 58 | 47 | 59 | 46 | 59 | 59 | 40 | 46 | 54 |
| Chemical-resistance | | | | | | | | | |
| 1 | >100 | >100 | >100 | >100 | >100 | >100 | >100 | >100 | >100 |
| 2 | 95 | 89 | 96 | 84 | 88 | 93 | 80 | 81 | 93 |
| 3 | >100 | >100 | >100 | >100 | >100 | >100 | >100 | >100 | >100 |
| 4 | >100 | >100 | >100 | >100 | >100 | >100 | >100 | >100 | >100 |
| 5 | 72 | 76 | 80 | 69 | 74 | 78 | 65 | 57 | 67 |
| 6 | 91 | 81 | 86 | 74 | 81 | 83 | 69 | 64 | 75 |
| 7 | 65 | 75 | 73 | 61 | 72 | 77 | 69 | 53 | 79 |

5: The ink was not transferred to the cotton cloth at all.
3: The ink was slightly transferred to the cotton cloth.
1: The ink was transferred to the cotton cloth and images transferred on the cotton cloth were readable.
4: The degree of the ink transfer between the scales 3 and 4.
2: The degree of the ink transfer between the scales 1 and 3.

EXAMPLE 18

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl methacrylate - acrylonitrile copolymer (weight ratio = 70:30) [Mw = 6400, Mn = 3600] | 70 |
| Lubricating properties-imparting agent: Carnauba wax | 10 |

The thus prepared ink layer coating liquid was coated on a polyester film serving as a substrate with a thickness of 4.5 μm, in a deposition amount of 2.0 μm on a dry basis, and dried, so that an ink layer was formed on the substrate.

Thermosensitivity-promoting Agent Layer

The following components were dispersed in toluene to form a thermosensitivity-promoting agent layer coating liquid containing 10% of solid components:

|  | Parts by Weight |
|---|---|
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 1.0 μm to form a thermosensitivity-promoting agent layer, whereby a thermal image transfer recording medium No. 18 according to the present invention was obtained.

EXAMPLE 19

The procedure for Example 18 was repeated except that methyl methacrylate - acrylonitrile copolymer employed in the ink layer coating liquid in Example 18 was replaced by the following copolymer, whereby a thermal image transfer recording medium No. 19 according to the present invention was obtained.

Copolymer: Methyl methacrylate - acrylonitrile (weight ratio=50 : 50) [Mw=7700, Mn=4100]

EXAMPLE 20

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl methacrylate - acrylonitrile copolymer (weight ratio = 70:30) [Mw = 6400, Mn = 3600] | 70 |
| Lubricating properties-imparting agent; Carnauba wax | 10 |

The thus prepared ink layer coating liquid was coated on a polyester film serving as a substrate with a thickness of 4.5 μm, in a deposition amount of 2.0 μm on a dry basis, and dried, so that an ink layer was formed on the substrate.

Thermosensitivity-promoting Agent Layer

The following components were dispersed in toluene to form a thermosensitivity-promoting agent layer coating liquid containing 10% of solid components:

|  | Parts by Weight |
|---|---|
| Ethylene - ethyl acrylate copolymer (containing 25 wt. % of ethyl acrylate) | 30 |
| Paraffin wax (melting point of 69° C.) | 70 |

The thus prepared thermosensitivity-promoting agent layer coating liquid was coated on the above-prepared ink layer in a deposition amount of 1.0 μm to form a thermo-sensitivity-promoting agent layer, whereby a thermal image transfer recording medium No. 20 according to the present invention was obtained.

EXAMPLE 21

Formation of Lubricating Properties-Imparting Agent Layer

A mixture of carnauba wax and paraffin wax at a mixing ratio by weight of 1:1 was dispersed in toluene to prepare a lubricating properties-imparting agent layer coating liquid.

The thus prepared lubricating properties-imparting agent layer coating liquid was coated on a polyester film serving as a substrate with a thickness of 4.5 μm, in a deposition amount of 1.0 μm on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl methacrylate - acrylonitrile copolymer (weight ratio = 70:30) [Mw = 6400, Mn = 3600] | 70 |

The thus prepared ink layer coating liquid was coated on the above-prepared lubricating properties-imparting agent layer, in a deposition amount of 2.5 μm on a dry basis, and dried, so that an ink layer was formed on the lubricating properties-imparting agent layer.

Thermosensitivity-promoting Agent Layer

The following components were dispersed in toluene to form a thermosensitivity-promoting agent layer coating liquid containing 20% of solid components

|  | Parts by Weight |
|---|---|
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 0.5 μm to form a thermosensitivity-promoting agent layer, whereby a thermal image transfer recording medium No. 21 according to the present invention was obtained.

EXAMPLE 22

Formation of Adhesion-promoting Agent Layer

A mixture of ethylene - vinyl acetate copolymer having a melt index of 150 (40% of vinyl acetate) and carnauba wax at a mixing ratio by weight of 3:7 was dispersed in toluene to prepare an adhesion-promoting agent layer coating liquid.

The thus prepared adhesion-promoting agent layer coating liquid was coated on a polyester film serving as a substrate with a thickness of 4.5 μm, in a deposition amount of 0.5 μm on a dry basis, and dried, so that an adhesion-promoting agent layer was formed on the substrate.

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - acrylonitrile copolymer (weight ratio = 70:30) [Mw = 6400, Mn = 3600] | 70 |
| Lubricating properties-imparting agent: Carnauba wax | 10 |

The thus prepared ink layer coating liquid was coated on the above-prepared adhesion-promoting agent layer, in a deposition amount of 2.5 μm on a dry basis, and dried, so that an ink layer was formed on the adhesion-promoting agent layer.

Thermosensitivity-promoting Agent Layer

The following components were dispersed in toluene to form a thermosensitivity-promoting agent layer coating liquid containing 10% of solid components:

|  | Parts by Weight |
| --- | --- |
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 0.5 μm to form a thermosensitivity-promoting agent layer, whereby a thermal image transfer recording medium No. 22 according to the present invention was obtained.

When the thus obtained thermal image transfer recording medium No. 22 was crumpled, the ink composition hardly fell off the recording medium and the adhesion promoting effect was confirmed.

EXAMPLE 23

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - acrylonitrile copolymer (weight ratio = 70:30) [Mw = 6400, Mn = 3600] | 57 |
| Additive agents: | |
| Flexibility-providing agent; Styrene butadiene rubber | 3 |
| Thermosensitivity-controlling agent; Linear polyester resin | 10 |
| Lubricating properties-imparting agent: Carnauba wax | 10 |

The thus prepared ink layer coating liquid was coated on a polyester film serving as a substrate with a thickness of 4.5 μm, in a deposition amount of 2.0 μm on a dry basis, and dried, so that an ink layer was formed on the substrate.

Thermosensitivity-promoting Agent Layer

The following components were dispersed in toluene to form a thermosensitivity-promoting agent layer coating liquid containing 10% of solid components:

|  | Parts by Weight |
| --- | --- |
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 1.0 μm to form a thermosensitivity-promoting agent layer, whereby a thermal image transfer recording medium No. 23 according to the present invention was obtained.

EXAMPLE 24

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - methacrylonitrile - glycidyl acrylate (weight ratio = 55:25:20) [Mw = 6100, Mn = 3200] | 70 |
| Lubricating properties-imparting agent: Carnauba wax | 10 |

The thus prepared ink layer coating liquid was coated on a polyester film serving as a substrate with a thickness of 4.5 μm, in a deposition amount of 3.0 μm on a dry basis, and dried, so that an ink layer was formed on the substrate.

Thermosensitivity-promoting Agent Layer

The following components were dispersed in toluene to form a thermosensitivity-promoting agent layer coating liquid 10% of solid components:

|  | Parts by Weight |
| --- | --- |
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 1.0 μm to form a thermosensitivity-promoting agent layer, whereby a thermal image transfer recording medium No. 24 according to the present invention was obtained.

EXAMPLE 25

The procedure for Example 24 was repeated except that the methyl methacrylate - methacrylonitrile - glycidyl acrylate employed in the ink layer coating liquid in Example 24 was replaced by the following copolymer, whereby a thermal image transfer recording medium No. 25 according to the present invention was obtained.

Copolymer: Methyl methacrylate - methacrylonitrile - glycidyl acrylate (weight ratio = 45:30:25) [Mw = 6900, Mn = 3800]

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - methacrylonitrile - glycidyl acrylate (weight ratio = 55:25:20) [Mw = 6900, Mn = 3200) | 70 |
| Lubricating properties-imparting agent: Carnauba wax | 10 |
| Thermosetting agent: $BF_3 \cdot C_2H_5NH_2$ | 1.5 |

The thus prepared ink layer coating liquid was coated on a polyester film serving as a substrate with a thickness of 4.5 μm, in a deposition amount of 3.0 μm on a dry basis, and dried, so that an ink layer was formed on the substrate.

Thermosensitivity-promoting Agent Layer

The following components were dispersed in toluene to form a thermosensitivity-promoting agent layer coating liquid 10% of solid components:

|  | Parts by Weight |
| --- | --- |
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 1.0 μm to form a thermosensitivity-promoting agent layer, whereby a thermal image transfer recording medium No. 26 according to the present invention was obtained.

EXAMPLE 27

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl methacrylate - methacrylonitrile - glycidyl acrylate (weight ratio = 55:25:20) [Mw = 6100, Mn = 3200) | 70 |
| Lubricating properties-imparting agent: Carnauba wax | 10 |

The thus prepared ink layer coating liquid was coated on a polyester film serving as a substrate with a thickness of 4.5 μm, in a deposition amount of 2.0 μm on a dry basis, and dried, so that an ink layer was formed on the substrate.

Thermosensitivity-promoting Agent Layer

The following components were dispersed in toluene to form a thermosensitivity-promoting agent layer coating liquid 10% of solid components:

|  | Parts by Weight |
| --- | --- |
| Ethylene - ethyl acrylate copolymer (containing 25 wt. % of ethyl acrylate) | 30 |
| Paraffin wax (melting point of 69° C.) | 70 |

The thus prepared thermosensitivity-promoting agent layer coating liquid was coated on the above-prepared ink layer in a deposition amount of 1.0 μm to form a thermosensitivity-promoting agent layer, whereby a thermal image transfer recording medium No. 27 according to the present invention was obtained.

EXAMPLE 28

Formation of Lubricating Properties-Imparting Agent Layer

A mixture of carnauba wax and paraffin wax at a mixing ratio by weight of 1:1 was dispersed in toluene to prepare a lubricating properties-imparting agent layer coating liquid.

The thus prepared lubricating properties-imparting agent layer coating liquid was coated on a polyester film serving as a substrate with a thickness of 4.5 μm, in a deposition amount of 1.0 μm on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - methacrylonitrile - glycidyl acrylate (weight ratio = 55:25:20) [Mw = 6100, Mn = 3200] | 70 |

The thus prepared ink layer coating liquid was coated on the above-prepared lubricating properties-imparting agent layer, in a deposition amount of 2.5 μm on a dry basis, and dried, so that an ink layer was formed on the lubricating properties-imparting agent layer.

Thermosensitivity-promoting Agent Layer

The following components were dispersed in toluene to form a thermosensitivity-promoting agent layer coating liquid 10% of solid components:

| | Parts by Weight |
|---|---|
| Ethylene - vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 0.5 μm to form a thermosensitivity-promoting agent layer, whereby a thermal image transfer recording medium No. 28 according to the present invention was obtained.

EXAMPLE 29

Formation of Lubricating Properties-Imparting Agent Layer

A mixture of carnauba wax and paraffin wax at a mixing ratio by weight of 1:1 was dispersed in toluene to prepare a lubricating properties-imparting agent layer coating liquid.

The thus prepared lubricating properties-imparting agent layer coating liquid was coated on a polyester film serving as a substrate with a thickness of 4.5 μm, in a deposition amount of 1.0 μm on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - methacrylonitrile - glycidyl acrylate (weight ratio = 55:25:20) [Mw = 6100, Mn = 3200] | 70 |
| Thermosetting agent: BF$_3$·C$_2$H$_5$NH$_2$ | 1.5 |

The thus prepared ink layer coating liquid was coated on the above-prepared lubricating properties-imparting agent layer, in a deposition amount of 2.5 μm on a dry basis, and dried, so that an ink layer was formed on the lubricating properties-imparting agent layer.

Thermosensitivity-promoting Agent Layer

The following components were dispersed in toluene to form a thermosensitivity-promoting agent layer coating liquid 10% of solid components:

| | Parts by Weight |
|---|---|
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 1.0 μm to form a thermosensitivity-promoting agent layer, whereby a thermal image transfer recording medium No. 29 according to the present invention was obtained.

EXAMPLE 30

Formation of Adhesion-promoting Agent Layer

A mixture of ethylene - vinyl acetate copolymer having a melt index of 150 (40% of vinyl acetate) and carnauba wax at a mixing ratio by weight of 1:1 was dispersed in toluene to prepare an adhesion-promoting agent layer coating liquid.

The thus prepared adhesion-promoting agent layer coating liquid was coated on a polyester film serving as a substrate with a thickness of 4.5 μm, in a deposition amount of 0.3 μm on a dry basis, and dried, so that an adhesion-promoting agent layer was formed on the substrate.

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - methacrylonitrile - glycidyl acrylate (weight ratio = 55:25:20) [Mw = 6100, Mn = 3200] | 70 |
| Lubricating properties-imparting agent: Carnauba wax | 10 |

The thus prepared ink layer coating liquid was coated on the above-prepared adhesion-promoting agent layer, in a deposition amount of 3.0 μm on a dry basis, and dried, so that an ink layer was formed on the adhesion-promoting agent layer.

Thermosensitivity-promoting Agent Layer

The following components were dispersed in toluene to form a thermosensitivity-promoting agent layer coating liquid 10% of solid components:

| | Parts by Weight |
|---|---|
| Ethylene-vinyl acetate copolymer (containing 40 wt. % of vinyl acetate) (melt flow rate = 70 g/min.) | 20 |
| Carnauba wax | 80 |

The thus prepared thermosensitivity-promoting agent layer coating liquid was coated on the above-prepared ink layer in a deposition amount of 1.0 μm to form a thermosensitivity-promoting agent layer, whereby a thermal image transfer recording medium No. 30 according to the present invention was obtained.

When the thus obtained thermal image transfer recording medium No. 30 was crumpled, the ink composition hardly fell off the recording medium and the adhesion promoting effect was confirmed.

The above-prepared thermal image transfer recording media No. 18 to No. 30 were subjected to the printing test under the same conditions as employed in the test conducted in the recording media No. 1 to No. 8. The coated paper (mirror-coat paper) and art paper were employed as recording sheets for the test. The results are given in Table 3 and Table 4.

EXAMPLE 31

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl methacrylate - acrylonitrile copolymer (weight ratio = 70:30) [Mw = 6400, Mn = 3600] | 70 |
| Lubricating properties-imparting agent: Carnauba wax | 10 |

The thus prepared ink layer coating liquid was coated on a polyester film serving as a substrate with a thick-

TABLE 3

| Example No. Test Items | 18 | 19 | 20 | 21 | 22 | 23 |
|---|---|---|---|---|---|---|
| Thermosensitivity (mJ/mm$^2$) (mirror-coat paper) | 18 | 19 | 19 | 18 | 19 | 18 |
| Thermosensitivity (mJ/mm$^2$) (art paper) | 21 | 22 | 22 | 21 | 22 | 21 |
| Friction resistance at high temperature (70° C.) Mirror-coat paper | Appearance of scars after 50 cycles of rubbing | The same as the left | The same as the left | The same as the left | The same as the left | The same as the left |
| Scratch resistance to a pencil with a hardness of 2H Mirror-coat paper | 74 | 70 | 67 | 78 | 69 | 68 |
| Scratch resistance to a stainless steel edge Mirror-coat paper | 31 | 29 | 25 | 33 | 21 | 22 |
| Chemical-resistance | | | | | | |
| 1 | 86 | 90 | 78 | 80 | 81 | 88 |
| 2 | 82 | 87 | 67 | 70 | 79 | 94 |
| 3 | >100 | >100 | >100 | >100 | >100 | >100 |
| 4 | >100 | >100 | >100 | >100 | >100 | >100 |
| 5 | 66 | 52 | 56 | 63 | 62 | 45 |
| 6 | 67 | 68 | 60 | 70 | 69 | 57 |
| 7 | 50 | 48 | 59 | 45 | 59 | 50 |

TABLE 4

| Example No. Test Items | 24 | 25 | 26 | 27 | 28 | 29 | 30 |
|---|---|---|---|---|---|---|---|
| Thermosensitivity (mJ/mm$^2$) (mirror-coat paper) | 18 | 19 | 18 | 18 | 18 | 18 | 19 |
| Thermosensitivity (mJ/mm$^2$) (art paper) | 20 | 22 | 21 | 20 | 19 | 19 | 22 |
| Friction resistance at high temperature (70° C.) Coated paper | Appearance of scars after 50 cycles of rubbing | Appearance of slight scars and stain after 50 cycles of rubbing | Appearance of scars after 50 cycles of rubbing | Appearance of scars after 50 cycles of rubbing | Appearance of scars after 50 cycles of rubbing | Appearance of scars after 50 cycles of rubbing | Appearance of slight scars and stain after 50 cycles of of rubbing |
| Scratch resistance to a pencil with a hardness of 2H Coated paper | 77 | 75 | 79 | 69 | 75 | 76 | 73 |
| Scratch resistance to a stainless steel edge Coated paper | 36 | 47 | 40 | 24 | 41 | 40 | 32 |
| Chemical-resistance | | | | | | | |
| 1 | 89 | 92 | 91 | 88 | 90 | 91 | 89 |
| 2 | 90 | 84 | 91 | 78 | 85 | 90 | 77 |
| 3 | >100 | >100 | >100 | >100 | >100 | >100 | >100 |
| 4 | >100 | >100 | >100 | >100 | >100 | >100 | >100 |
| 5 | 71 | 77 | 79 | 70 | 72 | 76 | 65 |
| 6 | 89 | 83 | 85 | 76 | 82 | 81 | 71 |
| 7 | 64 | 73 | 71 | 61 | 73 | 75 | 70 | ness of 4.5 μm, in a deposition amount of 2.0 μm on a dry basis, and dried, so that an ink layer was formed on the substrate.

Thermosensitivity-promoting Agent Layer

The following branched polyester resin having a melt viscosity of 15000 cps at 140° C. was coated on the above-prepared ink layer in a deposition amount of 1.0 μm to form a thermosensitivity-promoting agent layer, whereby a thermal image transfer recording medium No. 31 according to the present invention was obtained.

Branched polyester resin: a polycondensation product of the following dibasic acid and diol at a mixing ratio by weight of 50:50.
  Dibasic acid; phthalic anhydride
  Diol; a mixture of ethylene glycol, neopentyl glycol and trimethylolpropane at a mixing ratio by weight of 1:1:1.

EXAMPLE 32

The procedure for Example 31 was repeated except that methyl methacrylate - acrylonitrile copolymer employed in the ink layer coating liquid in Example 31 was replaced by the following copolymer, whereby a thermal image transfer recording medium No. 32 according to the present invention was obtained.
  Copolymer: Methyl methacrylate - acrylonitrile (weight ratio=50 : 50) [Mw=7700, Mn=4100]

EXAMPLE 33

The procedure for Example 31 was repeated except that the branched polyester resin employed in the thermo-sensitivity-promoting agent layer coating liquid in Example 31 was replaced by the following resin, whereby a thermal image transfer recording medium No. 33 according to the present invention was obtained.

Branched polyester resin having a melt viscosity of 23000 cps at 140°: a polycondensation product of the following dibasic acid and diol at a mixing ratio by weight of 50:50.
  Dibasic acid; adipic acid and phthalic anhydride
  Diol; a mixture of 1,6-hexanediol, ethylene glycol and trimethylol glycol at a mixing ratio by weight of 1:1:1.

EXAMPLE 34

Formation of Lubricating Properties-Imparting Agent Layer

A mixture of carnauba wax and paraffin wax at a mixing ratio by weight of 1:1 was dispersed in toluene to prepare a lubricating properties-imparting agent layer coating liquid.

The thus prepared lubricating properties-imparting agent layer coating liquid was coated on a polyester film serving as a substrate with a thickness of 4.5 μm, in a deposition amount of 1.0 μm on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - acrylonitrile copolymer (weight ratio = 70:30) [Mw = 6400, Mn = 3600] | 70 |

The thus prepared ink layer coating liquid was coated on the above-prepared lubricating properties-imparting agent layer, in a deposition amount of 2.5 μm on a dry basis, and dried, so that an ink layer was formed on the lubricating properties-imparting agent layer.

Thermosensitivity-promoting Agent Layer

The following branched polyester resin having a melt viscosity of 23000 cps at 140° C. was coated on the above-prepared ink layer in a deposition amount of 0.5 μm to form a thermosensitivity-promoting agent layer, whereby a thermal image transfer recording medium No. 34 according to the present invention was obtained.

Branched polyester resin: a polycondensation product of the following dibasic acid and diol at a mixing ratio by weight of 50:50.
  Dibasic acid; adipic acid and phthalic anhydride
  Diol; a mixture of 1,6-hexanediol, ethylene glycol and trimethylol glycol at a mixing ratio by weight of 1:1:1.

EXAMPLE 35

Formation of Adhesion-promoting Agent Layer

A mixture of ethylene - vinyl acetate copolymer having a melt index of 150 (40% of vinyl acetate) and carnauba wax at a mixing ratio by weight of 3:7 was dispersed in toluene to prepare an adhesion-promoting agent layer coating liquid.

The thus prepared adhesion-promoting agent layer coating liquid was coated on a polyester film serving as a substrate with a thickness of 4.5 μm, in a deposition amount of 0.5 μm on a dry basis, and dried, so that an adhesion-promoting agent layer was formed on the substrate.

Formation of Ink Layer

A mixture of the following components was dispersed in methyl ethyl ketone to prepare an ink layer coating liquid containing 20% of solid components:

| | Parts by Weight |
|---|---|
| Coloring agent: Carbon black | 20 |
| Copolymer: Methyl methacrylate - acrylonitrile copolymer (weight ratio = 70:30) [Mw = 6400, Mn = 3600] | 70 |
| Lubricating properties-imparting agent: Carnauba wax | 10 |

The thus prepared ink layer coating liquid was coated on the above-prepared adhesion-promoting agent layer, in a deposition amount of 2.5 μm on a dry basis, and dried, so that an ink layer was formed on the adhesion-promoting agent layer.

Thermosensitivity-promoting Agent Layer

The following branched polyester resin having a melt viscosity of 15000 cps at 140° C. was coated on the above-prepared ink layer in a deposition amount of 0.5 μm to form a thermosensitivity-promoting agent layer, whereby a thermal image transfer recording medium No. 35 according to the present invention was obtained.

Branched polyester resin: a polycondensation product of the following dibasic acid and diol at a mixing ratio by weight of 50:50.

Dibasic acid; phthalic anhydride

Diol; a mixture of ethylene glycol, neopentyl glycol and trimethylolpropane at a mixing ratio by weight of 1:1:1.

When the thus obtained thermal image transfer recording medium No. 35 was crumpled, the ink composition hardly fell off the recording medium and the adhesion promoting effect was confirmed.

EXAMPLE 36

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl methacrylate - acrylonitrile copolymer (weight ratio = 70:30) [Mw = 6400, Mn = 3600] | 57 |
| Additive agents: | |
| Flexibility-providing agent; Styrene butadiene rubber | 3 |
| Thermosensitivity-controlling agent; Linear polyester resin | 10 |
| Lubricating properties-imparting agent: Carnauba wax | 10 |

The thus prepared ink layer coating liquid was coated on a polyester film serving as a substrate with a thickness of 4.5 μm, in a deposition amount of 2.0 μm on a dry basis, and dried, so that an ink layer was formed on the substrate.

Thermosensitivity-promoting Agent Layer

The following branched polyester resin having a melt viscosity of 15000 cps at 140° C. was coated on the above-prepared ink layer in a deposition amount of 1.0 μm to form a thermosensitivity-promoting agent layer, whereby a thermal image transfer recording medium No. 36 according to the present invention was obtained.

Branched polyester resin: a polycondensation product of the following dibasic acid and diol at a mixing ratio by weight of 50:50.

Dibasic acid; phthalic anhydride

Diol; a mixture of ethylene glycol, neopentyl glycol and trimethylolpropane at a mixing ratio by weight of 1:1:1.

The above-prepared thermal image transfer recording media No. 31 to No. 36 according to the present invention were subjected to the printing test under the same conditions as employed in the test conducted in the recording media No. 1 to No. 8. The results are given in Table 5.

TABLE 5

| Example No. Test Items | Example | | | | | |
|---|---|---|---|---|---|---|
| | 31 | 32 | 33 | 34 | 35 | 36 |
| Thermosensitivity (mJ/mm$^2$) | 21 | 22 | 22 | 21 | 22 | 21 |
| Friction resistance at high temperature (70° C.) | | | | | | |
| PET | >100 Appearance of scars | >100 | >100 Appearance of scars | >100 | >100 | >100 |
| Coated paper | >100 | >100 | >100 Appearance of scars | >100 | >100 | >100 |
| Scratch resistance to a pencil with a hardness of 2H | | | | | | |
| PET | >100 | >100 | 88 | >100 | 85 | 80 |
| Coated paper | >100 | >100 | 91 | >100 | 89 | 84 |
| Scratch resistance to a stainless steel edge | | | | | | |
| PET | 81 | 85 | 70 | 92 | 75 | 65 |
| Coated paper | >100 | >100 | 90 | >100 | 79 | 79 |
| Chemical-resistance | | | | | | |
| 1 | 86 | 90 | 73 | 80 | 81 | 88 |
| 2 | 82 | 87 | 67 | 70 | 79 | 94 |
| 3 | >100 | >100 | >100 | >100 | >100 | >100 |
| 4 | >100 | >100 | >100 | >100 | >100 | >100 |
| 5 | 66 | 52 | 56 | 63 | 62 | 45 |
| 6 | 67 | 68 | 66 | 70 | 69 | 57 |
| 7 | 50 | 48 | 59 | 45 | 59 | 60 |

EXAMPLE 37

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl acrylate - acrylonitrile - glycidyl methacrylate (weight ratio = 55:25:20) [Mw = 6000, Mn = 3000) | 70 |
| Lubricating properties-imparting agent: Carnauba wax | 10 |

The thus prepared ink layer coating liquid was coated on a polyester film serving as a substrate with a thickness of 4.5 μm, in a deposition amount of 3.0 μm on a dry basis, and dried, so that an ink layer was formed on the substrate.

Thermosensitivity-promoting Agent Layer

The following branched polyester resin having a melt viscosity of 15000 cps at 140° C. was coated on the above-prepared ink layer in a deposition amount of 1.0 μm to form a thermosensitivity-promoting agent layer, whereby a thermal image transfer recording medium No. 37 according to the present invention was obtained.

Branched polyester resin: a polycondensation product of dibasic acid and diol at a mixing ratio by weight of 50:50.
  Dibasic acid; phthalic anhydride
  Diol; a mixture of ethylene glycol, neopentyl glycol and trimethylolpropane at a mixing ratio by weight of 1:1:1.

EXAMPLE 38

The procedure for Example 37 was repeated except that methyl acrylate - acrylonitrile - glycidyl methacrylate in the ink layer coating liquid employed in Example 37 was replaced by the following copolymer, whereby a thermal image transfer recording medium No. 38 according to the present invention was obtained.
  Copolymer: Methyl acrylate - acrylonitrile -glycidyl methacrylate (weight ratio=45:30:25) [Mw=6900, Mn=3800]

EXAMPLE 39

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl acrylate - acrylonitrile - glycidyl methacrylate (weight ratio = 55:25:20) [Mw = 6000, Mn = 3000) | 70 |
| Lubricating properties-imparting agent: Carnauba wax | 10 |
| Thermosetting agent: BF$_3$.C$_2$H$_5$NH$_2$ | 1.5 |

The thus prepared ink layer coating liquid was coated on a polyester film serving as a substrate with a thickness of 4.5 μm, in a deposition amount of 3.0 μm on a dry basis, and dried, so that an ink layer was formed on the substrate.

Thermosensitivity-promoting Agent Layer

The following branched polyester resin having a melt viscosity of 15000 cps at 140° C. was coated on the above-prepared ink layer in a deposition amount of 1.0 μm to form a thermosensitivity-promoting agent layer, whereby a thermal image transfer recording medium No. 39 according to the present invention was obtained.

Branched polyester resin: a polycondensation product of the following dibasic acid and diol at a mixing ratio by weight of 50:50.
  Dibasic acid; phthalic anhydride
  Diol; a mixture of ethylene glycol, neopentyl glycol and trimethylolpropane at a mixing ratio by weight of 1:1:1.

EXAMPLE 40

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl acrylate - acrylonitrile - glycidyl methacrylate (weight ratio = 55:25:20) [Mw = 6000, Mn = 3000) | 70 |
| Lubricating properties-imparting agent: Carnauba wax | 10 |

The thus prepared ink layer coating liquid was coated on a polyester film serving as a substrate with a thickness of 4.5 μm, in a deposition amount of 2.0 μm on a dry basis, and dried, so that an ink layer was formed on the substrate.

Thermosensitivity-promoting Agent Layer

The following branched polyester resin having a melt viscosity of 23000 cps at 140° C. was coated on the above-prepared ink layer in a deposition amount of 1.0 μm to form a thermosensitivity-promoting agent layer, whereby a thermal image transfer recording medium No. 40 according to the present invention was obtained.

Branched polyester resin: a polycondensation product of the following dibasic acid and diol at a mixing ratio by weight of 50:50.
  Dibasic acid; adipic acid and phthalic anhydride
  Diol; a mixture of 1,6-hexanediol, ethylene glycol and trimethylol glycol at a mixing ratio by weight of 1:1:1.

EXAMPLE 41

Formation of Lubricating-Properties-Imparting Agent Layer

A mixture of carnauba wax and paraffin wax at a mixing ratio by weight of 1:1 was dispersed in toluene to prepare a lubricating properties-imparting agent layer coating liquid.

The thus prepared lubricating properties-imparting agent layer coating liquid was coated on a polyester film serving as a substrate with a thickness of 4.5 μm, in a deposition amount of 1.0 μm on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

|  | Parts by Weight |
| --- | --- |
| Coloring agent: Carbon black | 20 |
| Copolymer: Methyl acrylate - acrylonitrile - glycidyl methacrylate (weight ratio = 55:25:20) [Mw = 6000, Mn = 3000) | 70 |

The thus prepared ink layer coating liquid was coated on the above-prepared lubricating properties-imparting agent layer, in a deposition amount of 2.5 μm on a dry basis, and dried, so that an ink layer was formed on the lubricating properties-imparting agent layer.

Thermosensitivity-promoting Agent Layer

The following branched polyester resin having a melt viscosity of 23000 cps at 140° C. was coated on the above-prepared ink layer in a deposition amount of 0.5 μm to form a thermosensitivity-promoting agent layer, whereby a thermal image transfer recording medium No. 41 according to the present invention was obtained.

Branched polyester resin: a polycondensation product of the following dibasic acid and diol at a mixing ratio by weight of 50:50.

Dibasic acid; adipic acid and phthalic anhydride
Diol; a mixture of 1,6-hexanediol, ethylene glycol and trimethylol glycol at a mixing ratio by weight of 1:1:1.

EXAMPLE 42

Formation of Lubricating Properties-Imparting Agent Layer

A mixture of carnauba wax and paraffin wax at a mixing ratio by weight of 1:1 was dispersed in toluene to prepare a lubricating properties-imparting agent layer coating liquid.

The thus prepared lubricating properties-imparting agent layer coating liquid was coated on a polyester film serving as a substrate with a thickness of 4.5 μm, in a deposition amount of 1.0 μm on a dry basis, and dried, so that a lubricating properties-imparting agent layer was formed on the substrate.

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl acrylate - acrylonitrile - glycidyl methacrylate (weight ratio = 55:25:20) [Mw = 6000, Mn = 3000] | 70 |
| Thermosetting agent: BF$_3$.C$_2$H$_5$NH$_2$ | 1.5 |

The thus prepared ink layer coating liquid was coated on the above-prepared lubricating properties-imparting agent layer, in a deposition amount of 2.5 μm on a dry basis, and dried, so that an ink layer was formed on the lubricating properties-imparting agent layer.

Thermosensitivity-promoting Agent Layer

The following branched polyester resin having a melt viscosity of 15000 cps at 140° C. was coated on the above-prepared ink layer in a deposition amount of 1.0 μm to form a thermosensitivity-promoting agent layer, whereby a thermal image transfer recording medium No. 42 according to the present invention was obtained.

Branched polyester resin: a polycondensation product of the following dibasic acid and diol at a mixing ratio by weight of 50:50.

Dibasic acid; phthalic anhydride
Diol; a mixture of ethylene glycol, neopentyl glycol and trimethylolpropane at a mixing ratio by weight of 1:1:1.

EXAMPLE 43

Formation of Adhesion-promoting Agent Layer

A mixture of ethylene - vinyl acetate copolymer having a melt index of 150 (40% of vinyl acetate) and carnauba wax at a mixing ratio by weight of 1:1 was dispersed in toluene to prepare an adhesion-promoting agent layer coating liquid.

The thus prepared adhesion-promoting agent layer coating liquid was coated on a polyester film serving as a substrate with a thickness of 4.5 μm, in a deposition amount of 0.3 μm on a dry basis, and dried, so that an adhesion-promoting agent layer was formed on the substrate.

Formation of Ink Layer

A mixture of the following components was dispersed in methyl ethyl ketone to prepare an ink layer coating liquid containing 20% of solid components:

|  | Parts by Weight |
|---|---|
| Coloring agent: Carbon black | 20 |
| Copolymer: Methyl acrylate - acrylonitrile - glycidyl methacrylate (weight ratio = 55:25:20) [Mw = 6000, Mn = 3000] | 70 |
| Lubricating properties-imparting agent: Carnauba wax | 10 |

The thus prepared ink layer coating liquid was coated on the above-prepared adhesion-promoting agent layer, in a deposition amount of 3.0 μm on a dry basis, and dried, so that an ink layer was formed on the adhesion-promoting agent layer.

Thermosensitivity-promoting Agent Layer

The following branched polyester resin having a melt viscosity of 15000 cps at 140° C. was coated on the above-prepared ink layer in a deposition amount of 1.0 μm to form a thermosensitivity-promoting agent layer, whereby a thermal image transfer recording medium No. 43 according to the present invention was obtained.

Branched polyester resin: a polycondensation product of the following dibasic acid and diol at a mixing ratio by weight of 50:50.

Dibasic acid; phthalic anhydride
Diol; a mixture of ethylene glycol, neopentyl glycol and trimethylolpropane at a mixing ratio by weight of 1:1:1.

When the thus obtained thermal image transfer recording medium No. 43 was crumpled, the ink composition hardly fell off the recording medium and the adhesion promoting effect was confirmed.

The above-prepared thermal image transfer recording media No. 37 to No. 43 were subjected to the printing test under the same conditions as employed in the test conducted in the recording media No. 9 to No. 17. The results are given in Table 6.

TABLE 6

| Example No.<br>Test Items | Example | | | | | | |
|---|---|---|---|---|---|---|---|
| | 37 | 38 | 39 | 40 | 41 | 42 | 43 |
| Thermosensitivity (mJ/mm$^2$) | 20 | 22 | 21 | 20 | 19 | 19 | 22 |
| Friction resistance at high temperature (100° C.) | | | | | | | |
| PET | Appearance of scars after 100 cycles of rubbing | Appearance of slight stain and scars after 100 cycles of rubbing | Appearance of scars after 100 cycles of rubbing | Appearance of scars after 100 cycles of rubbing | Appearance of scars after 100 cycles of rubbing | Appearance of scars after 100 cycles of rubbing | Appearance of slight scars and stain after 100 cycles of rubbing |
| Coated paper | No change after 100 cycles of rubbing | Appearance of slight stain after 100 cycles of rubbing | No change after 100 cycles of rubbing | The same as above | No change after 100 cycles of rubbing | No change after 100 cycles of rubbing | Appearance of slight stain after 100 cycles of rubbing |
| Scratch resistance to a pencil with a hardness of 2H | | | | | | | |
| PET | >100 | 98 | >100 | 67 | >100 | >100 | 87 |
| Coated paper | >100 | >100 | >100 | 83 | >100 | >100 | 91 |
| Scratch resistance to a stainless steel edge | | | | | | | |
| PET | 80 | 72 | 83 | 51 | 94 | 91 | 68 |
| Coated paper | 76 | 87 | 80 | 34 | 81 | 80 | 72 |
| Steam-iron resistance | | | | | | | |
| PET | 4 | 4 | 4 | 3 | 4 | 4 | 3 |
| Coated paper | 3 | 3 | 4 | 3 | 3 | 4 | 3 |
| Heat-resistance | | | | | | | |
| PET | 44 | 40 | 54 | 38 | 54 | 55 | 36 |
| Coated paper | 59 | 46 | 56 | 45 | 60 | 58 | 42 |
| Chemical-resistance | | | | | | | |
| 1 | 89 | 92 | 91 | 88 | 90 | 91 | 89 |
| 2 | 90 | 84 | 91 | 78 | 85 | 90 | 77 |
| 3 | >100 | >100 | >100 | >100 | >100 | >100 | >100 |
| 4 | >100 | >100 | >100 | >100 | >100 | >100 | >100 |
| 5 | 71 | 77 | 79 | 70 | 72 | 76 | 65 |
| 6 | 89 | 83 | 85 | 76 | 82 | 81 | 71 |
| 7 | 64 | 73 | 71 | 61 | 73 | 75 | 70 |

EXAMPLE 44

Formation of Ink Layer

A mixture of the following components was dispersed in 800 parts by weight of methyl ethyl ketone to prepare an ink layer coating liquid:

| | Parts by Weight |
|---|---|
| Coloring agent: Carbon black | 30 |
| Copolymer: Alkanolamine-modified polymer of formula (III): | |

$$+\!\!\left(CH_2-\underset{\underset{R^2}{\overset{\overset{R^1}{|}}{O-C=O}}}{C}\right)_{\!\!l}\!\!\left(CH_2-\underset{\underset{CN}{\overset{\overset{R^3}{|}}{|}}}{C}\right)_{\!\!m}\!\!\left(CH_2-\underset{\underset{CH_2-CH-CH_2N\overset{R^6}{\underset{R^5}{\diagdown}}}{\overset{\overset{R^4}{|}}{O-C=O}}}{\overset{|}{C}}\right)_{\!\!n}\!\!\left(CH_2-\underset{\underset{\underset{\underset{CH_2}{\diagup}}{\underset{O}{CH\diagdown}}}{\underset{CH_2}{|}}}{\overset{\overset{R^4}{|}}{O-C=O}}\right)_{\!\!x}$$

(III)

wherein R$^1$, R$^2$ and R$^4$ each represent CH$_3$; R$^3$ represents H; and R$^5$ and R$^6$ each represent C$_2$H$_4$OH.
(weight ratio of l:m:n:x = 30:45:25:0)
[Mw = 5300, Mn = 2300]

| | |
|---|---|
| | 145 |
| Lubricating properties-imparting agent: Carnauba wax | 25 |

The thus prepared ink layer coating liquid was coated on a polyester film serving as a substrate with a thickness of 4.5 μm, with a heat-resistant backing layer attached thereto, in a deposition amount of 3.0 μm on a dry basis, and dried, whereby a thermal image transfer recording medium No. 44 according to the present invention was obtained.

The ink layer was sufficiently flexible and there were no curling problems.

EXAMPLE 45

Formation of Lubricating Properties-imparting Agent Layer

A mixture of carnauba wax and a paraffin wax having a melting point of 69° C. at a mixing ratio by weight of 3:7 was coated by hot-melt coating on a polyester film having a thickness of 4.5 μm serving as a substrate, with a heat-resistant backing layer attached thereto, in a deposition amount of 1.0 μm, so that a lubricating properties-imparting agent layer was formed on the substrate.

The same ink layer coating liquid as prepared in Example 44 was coated on the above-prepared lubricating properties-imparting agent layer, in a deposition amount of transfer recording medium No. 45 according to the present invention was obtained.

EXAMPLE 46

Formation of Lubricating Properties-imparting Agent Layer

A mixture of carnauba wax and a paraffin wax having a melting point of 69° C. at a mixing ratio by weight of 3:7 was coated by hot-melt coating on a polyester film serving as a substrate with a thickness of 4.5 μm, with a heat-resistant backing layer attached thereto, in a deposition amount of 1.0 μm, so that a lubricating properties-imparting agent layer was formed on the substrate.

Formation of Ink Layer

A mixture of the following components was dispersed in 800 parts by weight of methyl ethyl ketone to prepare an ink layer coating liquid:

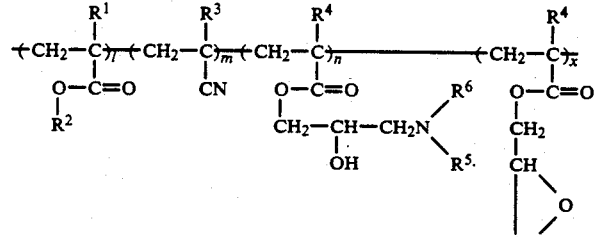

| | Parts by Weight |
|---|---|
| Coloring agent: Carbon black | 30 |
| Copolymer: Alkanolamine-modified polymer of formula (III): wherein $R^1$, $R^2$ and $R^4$ each represent $CH_3$; $R^3$ represents H; and $R^5$ and $R^6$ each represent $C_2H_4OH$. (weight ratio of l:m:n:x = 30:45:25:0) [Mw = 5300, Mn = 2300] | 127 |
| Blocked isocyanate: Adduct of 2,4-tolylene diisocyanate with trimethylolpropane; (methyl ethyl ketone oxime block) | 43 |

The thus prepared ink layer coating liquid was coated on the above-prepared lubricating properties-imparting agent layer, in a deposition amount of 2.5 μm on a dry basis, and dried, whereby a thermal image transfer recording medium No. 46 according to the present invention was obtained.

EXAMPLE 47

Formation of Lubricating Properties-imparting Agent Layer

A mixture of carnauba wax and a paraffin wax having a melting point of 69° C. at a mixing ratio by weight of 3:7 was coated by means of the hot-melt coating on a polyester film serving as a substrate with a thickness of 4.5 μm, with a heat-resistant backing layer attached thereto, in a deposition amount of 1.0 μm, so that a lubricating properties-imparting agent layer was formed on the substrate.

Formation of Ink Layer

A mixture of the following components was dispersed in 800 parts by weight of methyl ethyl ketone to prepare an ink layer coating liquid:

| | Parts by Weight |
|---|---|
| Coloring agent: Carbon black | 30 |
| Copolymer: Alkanolamine-modified polymer of formula (III): | |

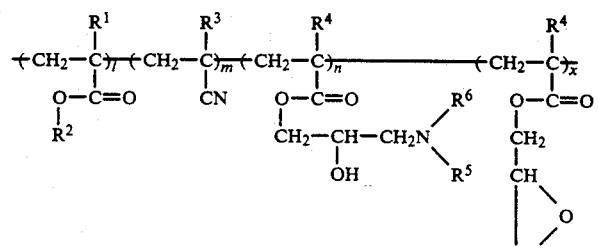

|  | Parts by Weight |
|---|---|
| wherein $R^1$, $R^2$ and $R^4$ each represent $CH_3$; $R^3$ represents H; and $R^5$ and $R^6$ each represent $C_2H_4OH$. (weight ratio of l:m:n:x = 30:45:15:10) [Mw = 5800, Mn = 2500] | 136 |
| Blocked isocyanate: Adduct of 2,4-tolylene diisocyanate with trimethylolpropane; (methyl ethyl ketone oxime block) | 34 |

The thus prepared ink layer coating liquid was coated on the above-prepared lubricating properties-imparting agent layer, in a deposition amount of 2.5 μm on a dry basis, and dried, whereby a thermal image transfer recording medium No. 47 according to the present invention was obtained.

EXAMPLE 48

Formation of Lubricating Properties-imparting Agent Layer

A mixture of carnauba wax and a paraffin wax having a melting point of 69° C. at a mixing ratio by weight of 3:7 was coated by hot-melt coating on a polyester film serving as a substrate with a thickness of 4.5 μm, with a heat-resistant backing layer attached thereto, in a deposition amount of 1.0 μm, so that a lubricating properties-imparting agent layer was formed on the substrate.

Formation of Ink Layer

A mixture of the following components was dispersed in 800 parts by weight of methyl ethyl ketone to prepare an ink layer coating liquid:

nauba wax at a mixing ratio by weight of 1:1 was dispersed in toluene to prepare an adhesion-promoting agent layer coating liquid.

The thus prepared adhesion-promoting agent layer coating liquid was coated on a polyester film serving as a substrate with a thickness of 4.5 μm, with a heat-resistant backing layer attached thereto, in a deposition amount of 0.5 μm on a dry basis, and dried, so that an adhesion-promoting agent layer was formed on the substrate.

The same ink layer coating liquid as prepared in Example 48 was coated on the above-prepared adhesion-promoting agent layer, in a deposition amount of 2.5 μm on a dry basis, and dried, whereby a thermal image transfer recording medium No. 49 according to the present invention was obtained.

EXAMPLE 50

Formation of Lubricating Properties-imparting Agent Layer

A mixture of carnauba wax and a paraffin wax having a melting point of 69° C. at a mixing ratio by weight of

|  | Parts by Weight |
|---|---|
| Coloring agent: Carbon black | 30 |
| Copolymer: Alkanolamine-modified polymer of formula (III): | |

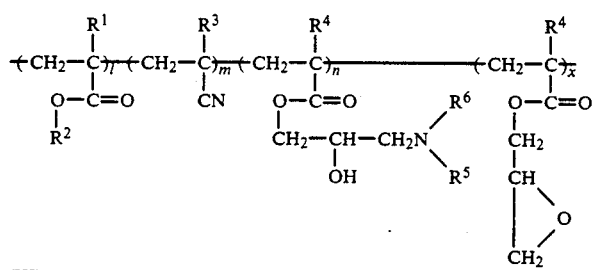

(III)

| wherein $R^1$, $R^2$ and $R^4$ each represent $CH_3$; $R^3$ represents H; and $R^5$ and $R^6$ each represent $C_2H_4OH$. (weight ratio of l:m:n:x = 30:45:15:10) [Mw = 5800, Mn = 2500] | 135 |
|---|---|
| Blocked isocyanate: Adduct of 2,4-tolylene diisocyanate with trimethylolpropane; (methyl ethyl ketone oxime block) | 30 |
| Thermosetting agent: $BF_3 \cdot C_2H_5NH_2$ | 5 |

The thus prepared ink layer coating liquid was coated on the above-prepared lubricating properties-imparting agent layer, in a deposition amount of 2.5 μm on a dry basis, and dried, whereby a thermal image transfer recording medium No. 48 according to the present invention was obtained.

EXAMPLE 49

Formation of Adhesion-promoting Agent Layer

A mixture of ethylene - vinyl acetate copolymer having a melt index of 150 (40% of vinyl acetate) and car- 3:7 was coated by hot-melt coating on a polyester film serving as a substrate with a thickness of 4.5 μm, with a heat-resistant backing layer attached thereto, in a deposition amount of 1.0 μm, so that a lubricating properties-imparting agent layer was formed on the substrate.

Formation of Ink Layer

A mixture of the following components was dispersed in 800 parts by weight of methyl ethyl ketone to prepare an ink layer coating liquid:

|  | Parts by Weight |
|---|---|
| Coloring agent: Carbon black | 30 |
| Copolymer: Alkanolamine-modified polymer of formula (III): | |

$$\mathrm{\underset{(III)}{+CH_2-\underset{\underset{R^2}{|}}{\underset{O-C=O}{|}}{\overset{R^1}{C}}\!\!)_l\!\!+\!CH_2-\underset{CN}{\overset{R^3}{C}}\!\!)_m\!\!+\!CH_2-\underset{\underset{\underset{OH}{|}}{\underset{CH_2-CH-CH_2N}{|}}{\underset{O-C=O}{|}}}{\overset{R^4}{C}}\!\!)_n\!\!\diagdown\!\!_{R^5}^{R^6}\quad +CH_2-\underset{\underset{\underset{CH}{|}}{\underset{CH_2}{|}}{\underset{O-C=O}{|}}}{\overset{R^4}{C}}\!\!)_x}$$

wherein $R^1$, $R^2$ and $R^4$ each represent $CH_3$; $R^3$ represents H;
and $R^5$ and $R^6$ each represent $C_2H_4OH$.
(weight ratio of l:m:n:x = 30:45:15:10)
[Mw = 100,000, Mn = 48,000]

|  |  |
|---|---|
| Blocked isocyanate: Adduct of 2,4-tolylene diisocyanate with trimethylolpropane; (methyl ethyl ketone oxime block) | 116<br>34 |

The thus prepared ink layer coating liquid was coated on the above-prepared lubricating properties-imparting agent layer, in a deposition amount of 2.0 μm on a dry basis, and dried, whereby a thermal image transfer recording medium No. 50 according to the present invention was obtained.

The above-prepared thermal image transfer recording media No. 44 to No. 50 according to the present invention were subjected to a printing test under the following conditions:

Recording sheet :
  (1) a label-type polyester film (PET) with the back thereof treated so as to be adhesive, and a release backing paper attached thereto.
  (2) coated paper (mirror-coat paper)

Thermal head : a thin-film type thermal head partially having a glaze layer.
Platen pressure : 150 g/cm²
Peel-off angle of thermal image transfer recording medium : 30° away from a recording sheet
Peel-off torque : 200 g
Applied energy : 10 to 30 mJ/mm²
Printing speed : 10 cm/sec The following characteristics were measured and evaluated in the course of the printing test.

Thermosensitivity: Represented by the minimum applied energy at which fine lines transferred to the mirror-coat paper did not become blurred.

Friction resistance at high temperatures: Each printed sample in which images were formed on the mirror-coat paper was placed on a glass plate in a container where the temperature was maintained at 100° C. The printed sample was subjected to a reciprocating rubbing test by rubbing the printed surface of the sample with a corrugated cardboard at a speed of 30 cm/sec, with a load of 100 g/cm² applied thereto. This characteristic was represented by the number of rubbings at which printed images became illegible.

Scratch resistance to a pencil with a hardness of 2H Each printed sample in which images were formed on the mirror-coat paper was rubbed by a pencil with a hardness of 2H, with a load of about 1 t/cm² applied thereto. This characteristic was represented by the number of rubbings at which printed images were scraped off the recording sheet and the recording sheet was exposed.

Scratch resistance to a stainless steel edge Each printed sample in which images were formed on the mirror-coat paper was rubbed by a stainless steel edge, with a load of about 1 t/cm² applied thereto. This characteristic was represented by the number of rubbings at which printed images were scraped off the recording sheet and the recording sheet was exposed.

Chemical-resistance Each printed sample in which images were formed on a PET film was rubbed by a cotton swab with 0.5 ml of each chemical, as listed below, absorbed, with a load of 30 g/mm² applied thereto. This characteristic was represented by the number of rubbings at which printed images were scraped off the recording sheet and the recording sheet was exposed.

Chemicals 1. ethanol
2. brake oil
3. kerosine
4. compound-containing car wax
5. toluene
6. xylene
7. "Perchlene" for dry cleaning

TABLE 7

| Example No.<br>Test Items | Examples | | | | | | |
|---|---|---|---|---|---|---|---|
|  | 44 | 45 | 46 | 47 | 48 | 49 | 50 |
| Thermosensitivity (mJ/mm²)<br>(mirror-coat paper) | 23 | 20 | 20 | 21 | 21 | 23 | 30 |
| Friction resistance at high temperature (100° C.)<br>(mirror-coat paper) | >100 | >100 | >100 | >100 | >100 | >100 | >100 |
| Scratch resistance to a pencil with a hardness of | 78 | 84 | >100 | >100 | >100 | >100 | >100 |

TABLE 7-continued

| Example No. Test Items | Examples | | | | | | |
|---|---|---|---|---|---|---|---|
| | 44 | 45 | 46 | 47 | 48 | 49 | 50 |
| 2H (mirror-coat paper) Scratch resistance to a stainless steel edge (mirror-coat paper) Chemical-resistance (PET) | 65 | 76 | >100 | >100 | >100 | >100 | >100 |
| 1 | 61 | 66 | 85 | 94 | 98 | 91 | >100 |
| 2 | 94 | 85 | 96 | >100 | >100 | >100 | >100 |
| 3 | >100 | >100 | >100 | >100 | >100 | >100 | >100 |
| 4 | >100 | >100 | >100 | >100 | >100 | >100 | >100 |
| 5 | 59 | 62 | 75 | 84 | 89 | >82 | 96 |
| 6 | 85 | 78 | 92 | >100 | >100 | >100 | >100 |
| 7 | 43 | 49 | 68 | 75 | 88 | >86 | >100 |

As previously explained, since the thermal image transfer recording media according to the present invention have an ink layer comprising a copolymer of acrylonitrile or methacrylonitrile, images transferred from the same onto a recording sheet show the remarkable improved friction and scratch resistance, in particular, to a hard object, and chemical resistance. Accordingly, the thermal image transfer recording media according to the present invention can produce highly reliable images for use in practice.

What is claimed is:

1. A thermal image transfer recording medium comprising a substrate and an ink layer formed directly thereon comprising as the main components (i) a coloring agent (ii) a copolymer consisting of at least one monomer selected from Group A consisting of acrylonitrile and methacrylonitrile and at least one monomer selected from Group B consisting of the monomers represented by formula (I);

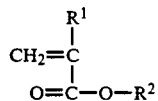

wherein R¹ represents hydrogen or a methyl group; and R² represents hydrogen or a straight-chain or branched alkyl group having 1 to 4 carbon atoms and (iii) a lubricant selected from Group C consisting of waxes, fatty amide, phosphate ester, silicone oil, perfluoroalkyl ester, silicone resin, fluoroalkyl ether resin, and particles of polytetrafluoroethylene, SiO and SiO₂.

2. The thermal image transfer recording medium as claimed in claim 1, wherein said copolymer has a weight-average molecular weight (Mw) in the range of 2,000 to 1,000,000, and a number-average molecular weight (Mn) in the range of 1,000 to 500,000 in terms of the value converted to polystyrene by gel permeation chromatography (GPC).

3. The thermal image transfer recording medium as claimed in claim 2, wherein said copolymer has a weight-average molecular weight (Mw) ranging from 3,000 to 500,000, and a number-average molecular weight (Mn) ranging from 1,500 to 250,000 in terms of the value converted to polystyrene by gel permeation chromatography (GPC).

4. The thermal image transfer recording medium as claimed in claim 1, wherein said copolymer consists of acrylonitrile and a comonomer represented by formula (I);

wherein R¹ represents hydrogen or a methyl group; and R² represents hydrogen or a straight-chain or branched alkyl group having 1 to 4 carbon atoms.

5. The thermal image transfer recording medium as claimed in claim 1, wherein said copolymer consists of methacrylonitrile and a comonomer represented by formula (I);

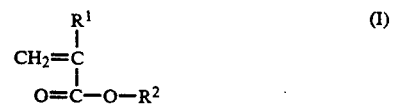

wherein R¹ represents hydrogen or a methyl group; and R² represents hydrogen or a straight-chain or branched alkyl group having 1 to 4 carbon atoms.

6. The thermal image transfer recording medium as claimed in claim 4, wherein said copolymer consists of acrylonitrile and a comonomer selected from the group consisting of methyl methacrylate, methyl acrylate, ethyl methacrylate, ethyl acrylate, n-butyl methacrylate, isobutyl methacrylate and tert-butyl methacrylate.

7. The thermal image transfer recording medium as claimed in claim 5, wherein said copolymer consists of methacrylonitrile and a comonomer selected from the group consisting of methyl methacrylate, methyl acrylate, ethyl methacrylate, ethyl acrylate, n-butyl methacrylate, isobutyl methacrylate and tert-butyl methacrylate.

8. The thermal image transfer recording medium as claimed in claim 6, wherein said copolymer consists of acrylonitrile and methyl methacrylate.

9. The thermal image transfer recording medium as claimed in claim 7, wherein said copolymer consists of methacrylonitrile and methyl methacrylate.

10. The thermal image transfer recording medium as claimed in claim 1, wherein said copolymer is selected from the group consisting of acrylonitrile - methyl methacrylate, acrylonitrile - methyl acrylate, acrylonitrile - ethyl methacrylate, acrylonitrile - ethyl acrylate, acrylonitrile - n-butyl methacrylate, acrylonitrile - isobutyl methacrylate, acrylonitrile - tert-butyl methacrylate, methacrylonitrile - methyl methacrylate, methacrylonitrile - methyl acrylate, methacrylonitrile - ethyl methacrylate, methacrylonitrile - ethyl acrylate, methacrylonitrile - n-butyl methacrylate, methacrylonitrile - isobutyl methacrylate and methacrylonitrile - tert-butyl methacrylate.

11. The thermal image transfer recording medium as claimed in claim 1, wherein said lubricant is selected from the group consisting of waxes and silicone oil.

12. The thermal image transfer recording medium as claimed in claim 11, wherein said waxes are selected from the group consisting of natural paraffin wax, candelilla wax, and carnauba wax.

13. The thermal image transfer recording medium as claimed in claim 1, wherein $R^2$ in formula (I) represents a methyl group.

* * * * *

UNITED STATES PATENT AND TRADEMARK OFFICE
CERTIFICATE OF CORRECTION

PATENT NO. : 5,258,234  
DATED : November 2, 1993  
INVENTOR(S) : Youji Ide, et al.

Page 1 of 3

It is certified that error appears in the above-indentified patent and that said Letters Patent is hereby corrected as shown below:

Column 1, line 11, "cf" should read --of--.

Column 4, line 28, "can exhibits" should read --exhibits--.

Column 4, line 64, "layer" should read --layer.--.

Column 5, line 15, "glycidy" should read --glycidyl--.

Column 5, line 48, "[20 to 40%)" should read --(20 to 40%)--.

Column 14, line 23, "rubbing" should read --rubbings--.

Column 14, line 31, "rubbing" should read --rubbings--.

Column 15, line 25, "Mn = 3200)" should read --Mn = 3200]--.

Column 15, line 45, "Mn = 3800)" should read --Mn = 3800]--.

Column 15, line 59, "Mn = 3200)" should read --Mn = 3200]--.

Column 16, line 27, "Mn = 3200)" should read --Mn = 3200]--.

Column 16, line 63, "Mn = 3200)" should read --Mn = 3200]--.

Column 17, line 28, "Mn = 3200)" should read --Mn = 3200]--.

UNITED STATES PATENT AND TRADEMARK OFFICE
CERTIFICATE OF CORRECTION

PATENT NO. : 5,258,234
DATED : November 2, 1993
INVENTOR(S) : Youji Ide, et al.

It is certified that error appears in the above-indentified patent and that said Letters Patent is hereby corrected as shown below:

Column 18, line 22, "Mn = 3200)" should read --Mn = 3200]--.

Column 22, line 57 "components." should read --components:--.

Column 24, line 60, "Mn = 3200)" should read --Mn = 3200]--.

Column 25, line 43, "Mn = 3200)" should read --Mn = 3200]--.

Column 26, line 18, "Mn = 3200)" should read --Mn = 3200]--.

Column 27, line 8, "Mn = 3200)" should read --Mn = 3200]--.

Column 27, line 61, "Mn = 3200)" should read --Mn = 3200]--.

Column 28, line 46, "Mn = 3200)" should read --Mn = 3200]--.

Column 30, line 13, "Mn = 3600)" should read --Mn = 3600]--.

Column 32, line 7, "Mn = 3600)" should read --Mn = 3600]--.

Column 34, line 63, "Mn = 3000)" should read --Mn = 3000]--.

Column 35, line 44, "Mn = 3000)" should read --Mn = 3000]--.

Column 36, line 15, "Mn = 3000)" should read --Mn = 3000]--.

Column 36, line 65, "Mn = 3000)" should read --Mn = 3000]--.

Column 37, line 49, "Mn = 3000)" should read --Mn = 3000]--.

Column 38, line 34, "Mn = 3000)" should read --Mn = 3000]--.

UNITED STATES PATENT AND TRADEMARK OFFICE
CERTIFICATE OF CORRECTION

PATENT NO. : 5,258,234
DATED : November 2, 1993
INVENTOR(S) : Youji Ide, et al.

It is certified that error appears in the above-indentified patent and that said Letters Patent is hereby corrected as shown below:

Column 41, lines 39-41, "amount of transfer" should read -- amount of 2.5 μm on a dry basis, and dried, whereby a thermal image transfer--

Signed and Sealed this

Thirteenth Day of December, 1994

Attest:

BRUCE LEHMAN

*Attesting Officer*  *Commissioner of Patents and Trademarks*